United States Patent
Hagg

(10) Patent No.: US 8,833,362 B2
(45) Date of Patent: Sep. 16, 2014

(54) HEAT RECOVERY INSTALLATION USING SOLAR ENERGY

(75) Inventor: Franklin Hagg, Alkmaar (NL)

(73) Assignee: Innovy (NL)

( * ) Notice: Subject to any disclaimer, the term of this patent is extended or adjusted under 35 U.S.C. 154(b) by 901 days.

(21) Appl. No.: 12/993,763

(22) PCT Filed: May 18, 2009

(86) PCT No.: PCT/NL2009/000117
§ 371 (c)(1),
(2), (4) Date: Jan. 10, 2011

(87) PCT Pub. No.: WO2009/142475
PCT Pub. Date: Nov. 26, 2009

(65) Prior Publication Data
US 2011/0114084 A1  May 19, 2011

(30) Foreign Application Priority Data
May 21, 2008 (NL) ..................................... 2001599

(51) Int. Cl.
| | |
|---|---|
| *E04D 13/18* | (2014.01) |
| *F24J 2/34* | (2006.01) |
| *F24J 2/20* | (2006.01) |
| *F24J 2/46* | (2006.01) |
| *F28D 20/00* | (2006.01) |
| *F28D 9/00* | (2006.01) |
| *F24F 12/00* | (2006.01) |
| *F28D 21/00* | (2006.01) |
| *F24F 5/00* | (2006.01) |

(52) U.S. Cl.
CPC ............... *F24F 12/006* (2013.01); *Y02B 30/16* (2013.01); *F24J 2/20* (2013.01); *F24J 2/4647* (2013.01); *F24J 2/202* (2013.01); *F28D 20/0052* (2013.01); *Y02B 10/20* (2013.01); *Y02E 60/142* (2013.01); *F28D 9/0075* (2013.01); *Y02E 70/30* (2013.01); *F24F 2012/007* (2013.01); *Y02E 10/44* (2013.01); *F28D 21/0014* (2013.01); *F24J 2/34* (2013.01); *F24F 2005/0064* (2013.01)
USPC ............................ 126/629; 126/628; 126/617

(58) Field of Classification Search
CPC ............ F28D 21/0014; F28F 3/00; F28F 3/08
USPC ......... 126/678, 629, 630, 631, 632, 628, 616, 126/613; 165/166, 167, 48.1, 53, 909, 174
See application file for complete search history.

(56) References Cited

U.S. PATENT DOCUMENTS

| 4,019,494 A | * | 4/1977 | Safdari | .......................... 126/658 |
| 4,503,908 A | * | 3/1985 | Rosman et al. | ............... 165/167 |

(Continued)

FOREIGN PATENT DOCUMENTS

| DE | 29 44 230 A1 | 5/1981 |
| DE | 35 01 756 A1 | 8/1985 |

(Continued)

*Primary Examiner* — Avinash Savani
*Assistant Examiner* — Vivek Shirsat
(74) *Attorney, Agent, or Firm* — John S. Sopko; Hoffmann & Baron, LLP

(57) ABSTRACT

A heat recovery installation using solar energy includes a three-channel plate, in which the first channel layer, viewed from the outside, alternately discharges used air and supplies fresh air. The third channel layer, viewed from the outside, ensures the supply of used air and the discharge of fresh air, while in the second channel layer, viewed from the outside, the heat exchange between the used and fresh air takes place according to the counterflow principle. In order to produce this flow, small apertures are provided in the second and third plates, viewed from the outside, of the three-channel plate, as a result of which the flow in the channel layer, viewed from the outside, is at right angles to the channel plate. By making the airflow quicker than the heat flow (Pe>>1), no heat can flow from the inside to the outside, except for a small loss flow through the partitions and through radiation and, conversely, mainly heat exchange of the used to fresh air according to the counterflow principle takes place with heat recovery. If the channel plate is made of transparent material and the inner plate is provided with a (sun)light absorber, then (sun)light which shines on the three-channel plate is also converted into heat and given off directly and indirectly to the fresh air.

19 Claims, 17 Drawing Sheets

(56) References Cited

U.S. PATENT DOCUMENTS 5,036,906 A      8/1991   Rylewski
5,222,551 A *    6/1993   Hasegawa et al. ............ 165/167
7,661,422 B2 *   2/2010   Liu et al. ....................... 126/629

FOREIGN PATENT DOCUMENTS

| EP | 0 275 758 A1 | 7/1988 |
| FR | 2 727 790 A1 | 6/1996 |
| WO | 2006/111621 A1 | 10/2006 |

* cited by examiner

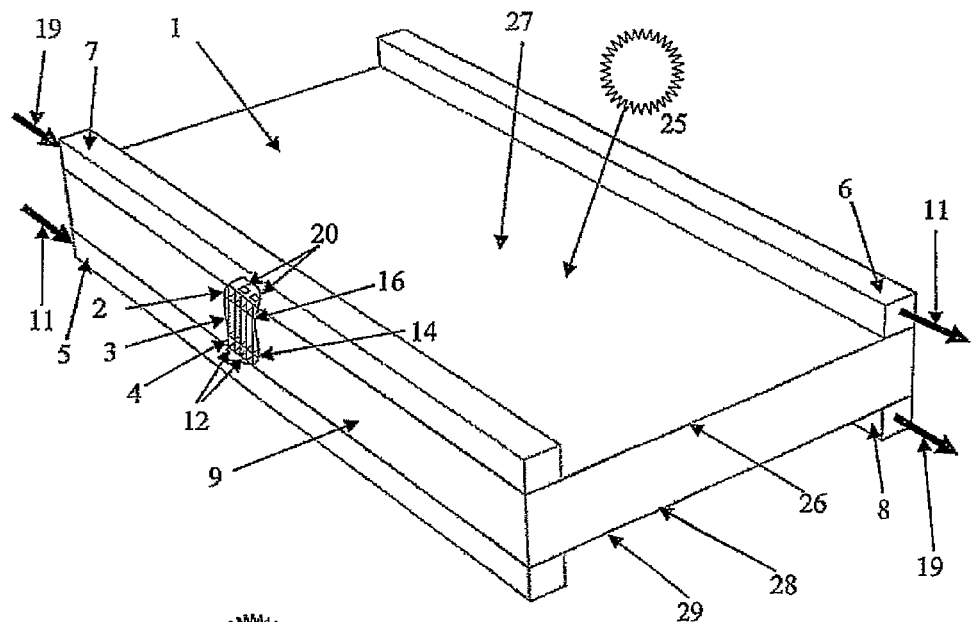
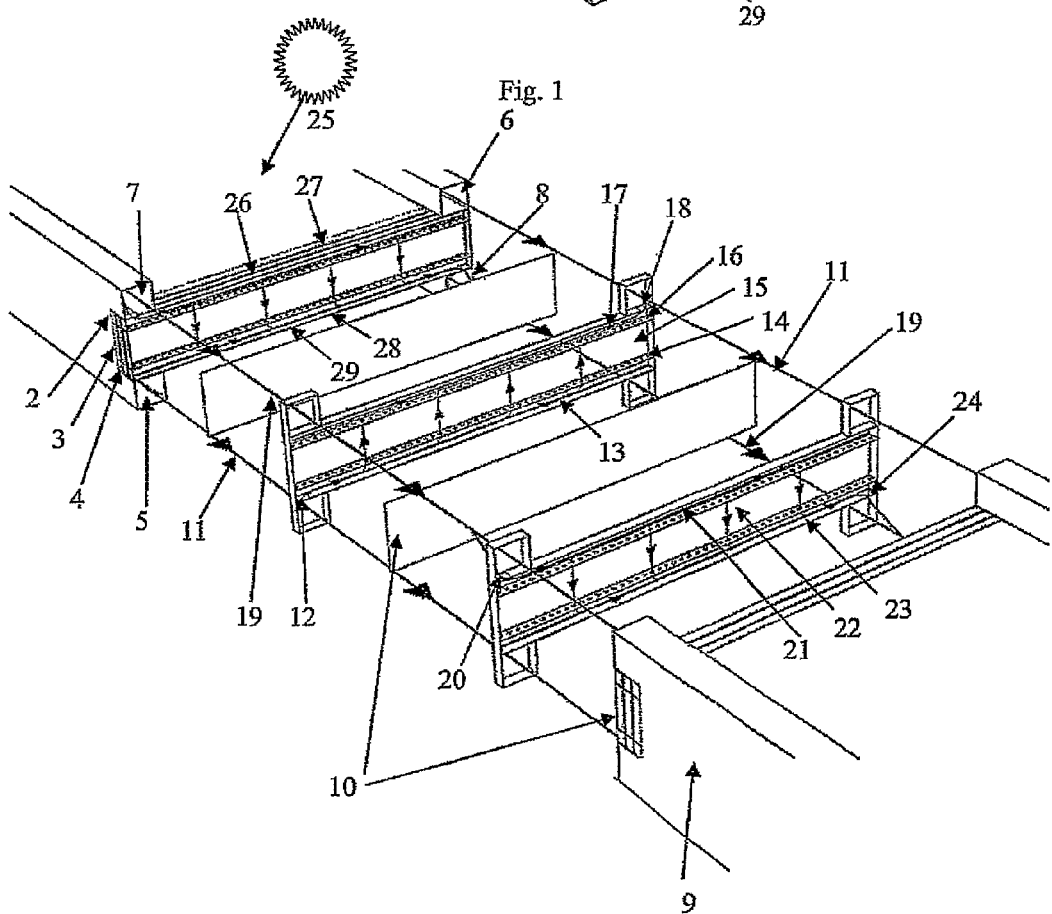
Fig. 1
Fig. 2

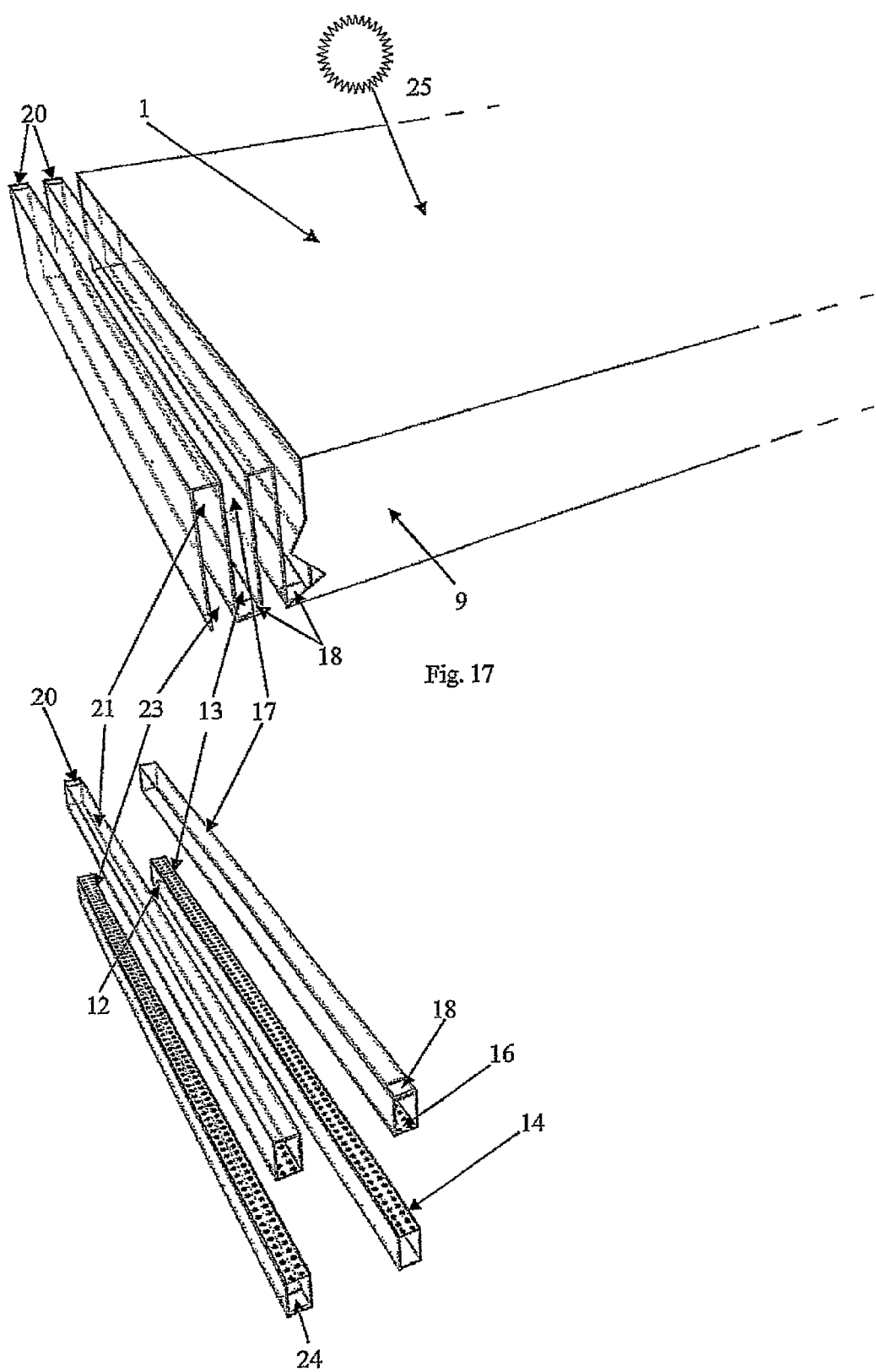

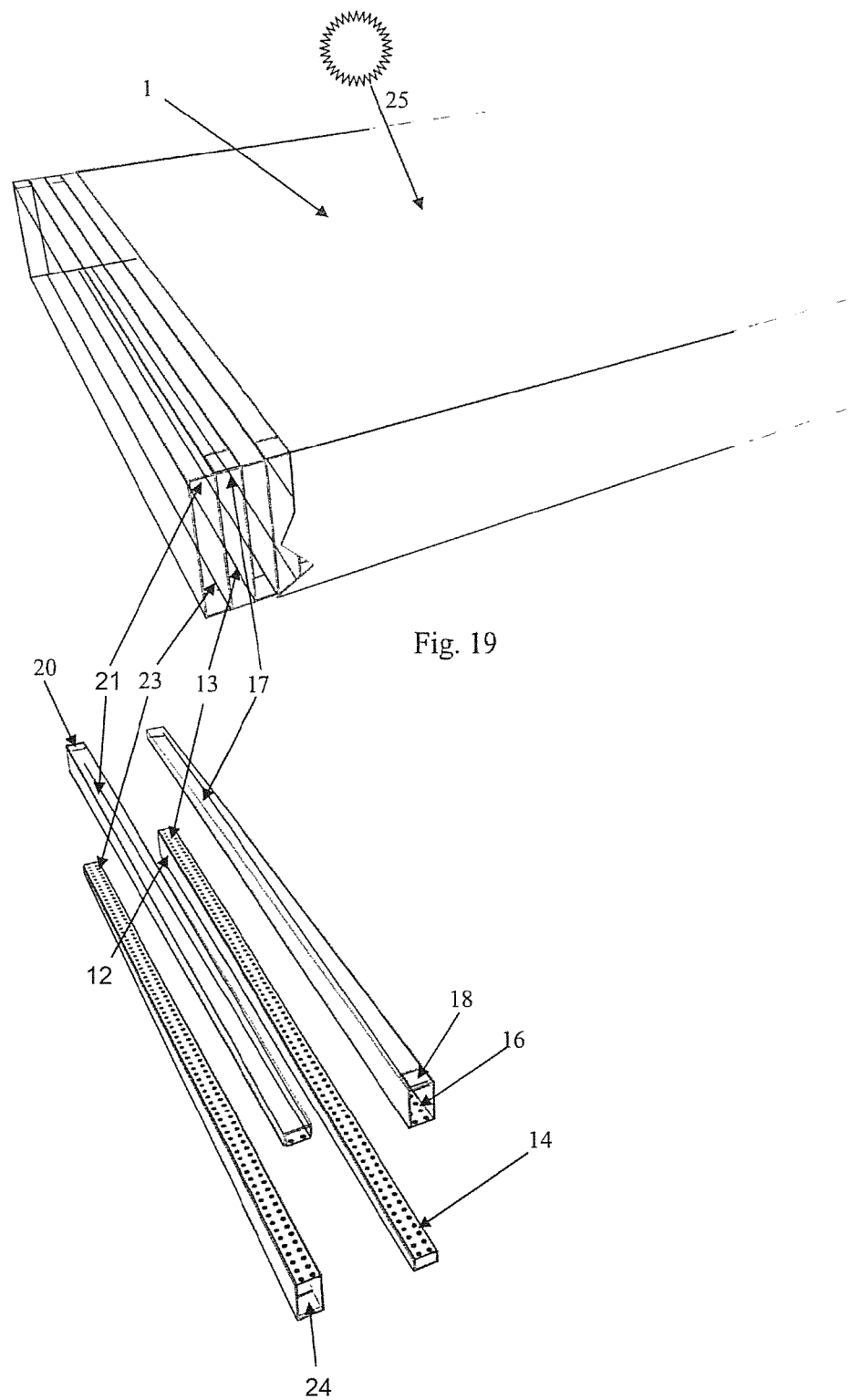

HEAT RECOVERY INSTALLATION USING SOLAR ENERGY

CROSS-REFERENCE TO RELATED APPLICATIONS

This application is the National Stage of International Application No. PCT/NL2009/000117, filed May 18, 2009, which claims the benefit of Netherlands Application No. 2001599, filed May 21, 2008, the contents of which is incorporated by reference herein.

FIELD OF THE INVENTION

The present invention relates to a heat recovery installation using solar energy.

BACKGROUND OF THE INVENTION

A heat recovery installation is suitable for recovering heat from a relatively hot source of heat to a relatively cold source of heat and vice versa. The device is particularly suitable for recovering heat from used ventilation air from buildings. In this case, the fresh ventilation air coming in from outside is heated by means of the discharged used ventilation air if the outside air is colder than the air in the building. Conversely, the device can cool down incoming fresh air by means of the outflowing used air if the air outside is hotter than the air inside the building.

A car radiator is a known heat exchanger which cools the coolant in the engine by means of air which flows through it. Just before the air entry point the air has the same temperature as the ambient air, and a few centimeters downstream the air has a much higher temperature at the air exit point as a result of having cooled the coolant in the radiator. Due to the velocity of the air, the heat in the hotter air downstream cannot flow to the colder air upstream and the radiator forms an optimum barrier against heat which would like to flow from the hot side to the cold side. Such a barrier is also referred to as a superadiabatic flow. The flow is superadiabatic if the velocity of the inflowing air is greater than the velocity of the heat, which wants to flow from hot to cold. (Pushing a metal rod sufficiently quickly into a hot liquid will not result in scalding of your hands). The heat velocity of a substance is expressed in Péclet (Pe), which has to be significantly greater than 1 ($Pe \gg 1$) in order to achieve a good superadiabatic flow, with the downstream heat insulation being optimal.

A known superadiabatic burner preheats the inlet air of a radiation burner for a thermophotovoltaic cell (TPV) [reference: K. Hanamura, TPV Power Generation using Super-Adiabatic Combustion in Porous Quartz Glass]. In this case, the TPV converts the radiation into electrical energy. As the TPV operates at room temperature, a transparent insulation has to be provided between the TPV and the burner. With the known burner, porous quartz walls are used for this purpose, as a result of which the inlet air flows superadiabatically and also recovers the heat radiation loss in the quartz in the process. Due to the superadiabatic flow, the heat of the burner cannot flow against the flow and the TPV remains at room temperature. This burner has the drawback that a significant amount of heat is lost in the exhaust of the burner which cannot be recovered through the inlet air which flows through the porous quartz walls.

Known heat recovery installations for ventilation air consist of a heat exchanger, in which the discharged ventilation air flows on one side of a wall and the inflowing ventilation air flows on the other side. The heat is in this case exchanged according to the counterflow principle. Examples thereof are compact heat exchangers, heat wheels and the Fiwihex. The counterflow principle, in which the discharged air flows in the direction opposite to that of the fresh air, is necessary in order to achieve an efficiency in excess of 95% in practice. In co-current, for example, the maximum efficiency which can be achieved theoretically is only 50%, and in crosscurrent the maximum efficiency which can be achieved, depending on the angle at which crossing takes place, is theoretically between 50 and 100%. The known heat recovery installations for ventilation air are not suitable for insulating large surface areas by means of superadiabatic flow and for collecting heat from (sun)light.

Known solar collectors are solar boilers which are insulated against heat loss using glass wool or foam on the shadow side and transparent channel plate on the sun side. Channel plate consists of several plates which are arranged parallel to one another and between which air cavities are present. The plates are kept at a distance from one another by means of partitions which are arranged parallel to one another. Thus, channels are created in the air cavities between the partitions and the plates which run parallel to one another. In the case of two plates, one layer of channels is thus formed (channel layer) or a single-channel plate, and with several plates n, n−1 channel layers or an (n−1) channel plate is created. Thus, four plates result in a three-channel plate. Although channel plates insulate reasonably well and are therefore widely used for passive heating of glasshouses and greenhouses, much of the heat of the incident and collected (sun)light is lost, particularly in winter when there is little natural light and the environment is cold.

Due to environmental problems and the fact that the supply of fuels is finite, there is an increasing need to recover heat and use solar heat, as well as to store it. In addition, due to the improved insulation of buildings, the need for central ventilation with increasingly large flow rates becomes greater and the demand will rise for compact and inexpensive integrated heating and ventilation installations, which produce heat in the winter in a highly efficient manner, both from (sun)light and through the recovery of ventilation air, and using as little as possible of the increasingly expensive and environmentally polluting primary energy. In addition, there is an increasing demand to achieve cooling in the summer using as little as possible of the increasingly expensive and environmentally polluting primary energy.

SUMMARY OF THE INVENTION

It is an object of the present invention to provide a combination of the abovementioned possibilities which is relatively compact and inexpensive and has improved efficiency.

To this end, the present invention provides an integrated thermodynamic installation for heating and cooling buildings, comprising:

a transparent laminar counterflow heat exchanger with superadiabatic flow, realized in a modified channel plate.

The installation can insulate a part of a building on which the installation is arranged more effectively by means of a superadiabatic flow of air.

In one embodiment, the installation can be combined with:
a (sun)light absorber;
a heat exchanger, which exchanges heat with a heat and cold storage system; and/or
a covering system against (sun)light to prevent excess heating.

The installation according to the present invention comprises a modified transparent three-channel plate, which insulates the solar collector on the sun side. The modification of the channel plate which is to be carried out according to the present invention consists of perforating the two plates and providing air flow distributors and headers from and to the various individual channels in the channel plate.

In the first channel layer, viewed from the outside, the alternate individual channels are alternately used for supplying the fresh outside air and discharging the used ventilation air (first ventilation supply and discharge channel layer), respectively. The second parallel plate between the first and second channel layer, viewed from the outside, is perforated, in which, alternately, fresh air is supplied to the channels of the second channel layer and used air is discharged.

In the third channel layer, viewed from the outside, alternately, fresh air is discharged and used air is supplied (second ventilation supply and discharge channel layer).

The third parallel plate between the second and third channel layer, viewed from the outside, is also perforated, in which, alternately, fresh air is discharged from the channels of the second channel layer and used air is supplied.

In this case in the second channel layer, viewed from the outside, in the adjacent individual channels, fresh air alternately flows from the perforations of the second plate to the perforations of the third plate. In addition, in the second channel layer in the opposite direction, in the adjacent individual channels, used air flows alternately from the perforations of the third plate to the perforations of the second plate. Between the used air and the fresh air flowing opposite to one another, the partitions of the second channel layer are arranged which, due to the temperature difference transfer heat from and to the two air streams. In this case, heat exchange and thus heat recovery takes place between the fresh ventilation air and the used ventilation air according to the counterflow principle between the partitions of the second channel layer (heat recovery channel layer). Due to the fact that the wall thickness of the partitions is small and the surface large, the recovery efficiency is high. In this case, the heat recovery flow is at right angles to the partitions and parallel to the plates. However, the airflow between the perforated plates is at right angles to the channel plate surface and parallel to the parasitic heat loss flow in the channel plate, which flows from the inside to the outside in winter and from the outside to the inside in summer. Particularly in winter, when it is hotter inside than outside, the parasitic heat loss wants to flow to the outside as a result of the inflowing fresh air, which is not possible if the fresh air flows more quickly than the parasitic loss flow (Pe>>1). In half of the alternate individual channels, the flow is then superadiabatic with a highly efficient heat insulation and heat is recovered alternately from the other half of the individual channels with a high degree of efficiency. Mainly in summer, when it is colder inside than outside, the parasitic heat loss wants to flow to the inside due to the outflowing used air, which is not possible if the used air flows more quickly than the parasitic loss flow (Pe>>1). In half of the alternate individual channels, the flow is then superadiabatic with a highly efficient heat insulation and heat is recovered alternately in the other half of the individual channels with a high degree of efficiency. This is in contrast with the known insulation of the TPV radiation burner, in which the heat from the discharged air is not recovered. The integral insulation by means of superadiabatic flow and highly efficient heat recovery of the present invention results in a significant improvement in thermodynamic efficiency. Also in contrast with the known solar collectors, the parasitic losses on the sun side of the collectors, when using the channel plate according to the present invention, are many times smaller (4 to 10 times smaller) as a result of the use of superadiabatic flow than when using the known channel plate which has not been modified according to the present invention. In addition, this has the advantage that, by means of the modifications according to the present invention, heat is also recovered from ventilation air using the same channel plate.

In order to achieve a sufficient degree of heat recovery transfer in the heat recovery channel layer through the partitions and a sufficiently high Péclet number for the superadiabatic flow, the channels in the direction at right angles to the channel plate are higher than the channels in the other channel layers (the ventilation supply and discharge channel layers). The fourth parallel plate of the channel plate, viewed from the outside, is provided with a strong (sun)light-absorbing surface, which can give off the heat generated by the (sun)light to the ventilation air.

The openings on the end faces of the channel plates are connected to headers, which collect the various alternately flowing media and distribute them in a circulation of fresh and used ventilation air. In order to collect as much heat as possible during the winter months, the surface of the heat recovery installation is preferably directed as much as possible in the main direction of the sun during the winter (in the Netherlands facing south at an angle of approximately 70 degrees to the horizontal plane) and installed on the outside wall of a building. In order to reduce the pressure drop in the supply and discharge channel layers, the channels are approximately 50 cm long, while the plates are approximately 4 m wide. The channel plates thus have a surface of 0.5×4 m and the surface which is facing the sun is therefore approximately 2 $m^2$. The height of the supply and discharge channel layers is approximately 1 to 2 cm and the height of the heat recovery channel layers is approximately 5 cm, so that the channel plate overall is approximately 8 cm high (thick).

For larger surfaces, several channel plates with headers can be arranged next to one another and the headers can be connected by main headers to one another according to the type of medium.

The used ventilation air is pumped from the building to the used-air supply header using a fan and then flows to the outside via the channel plate and the used-air discharge header. Due to the resulting underpressure in the building, fresh outside air flows into the interior of the building via the fresh-air supply header, the channel plate and the fresh-air discharge header. The heat recovery installation according to the present invention which collects (sun)light and uses superadiabatic flow thus has a large surface and a large passage with a low flow rate, resulting in a low loss of flow, while the heat collected from the incident (sun)light and the heat of the space situated behind it is also insulated by means of superadiabatic flow offering the advantage of very low parasitic losses with regard to the additional collection of (sun) light and of the building situated behind it. This insulation is much more efficient than with the known solar collectors covered with double glazing or known channel plate, so that the collector efficiency is high, even at low light intensity (1000 lumen) and in a cold environment (<5° C.), which is a situation which is quite common, particularly during the winter months.

In normal operation during the winter months, the fresh ventilation air is heated by the used ventilation air and the heat content of the building is able to store any additional heat from (sun)light, without the desired temperature changing significantly. Under more extreme circumstances (prolonged sunshine or cold weather), the heat content of the building is not sufficient and additional heating or cooling is required. In order to save on expensive primary energy, it is advantageous, up to a certain size, to have an additional storage system, in which case the ground under the building which is already present anyway can be used.

In one application of the heat recovery installation according to the present invention, the fresh ventilation air provided with recovered heat and with heat which is heated by the (sun)light first flows to a second heat exchanger, which exchanges heat with a heat transport medium which flows through a heat store. Preferably, this store is the ground under the building. This second heat exchanger then provides the correct temperature adjustment of the ventilation air by transporting the excess heat in the ventilation air to the ground under the house for storage before or during the winter season. Conversely, when there is a shortage of heat, heat is brought from the store to the fresh ventilation air by extracting it from the ground, as long as the ground has the required temperature. If the temperature of the ground is too low, but there is a shortage of heat, then an inexpensive electric heater or fuel heater can be used for additional heating.

During and prior to the summer season, the additional heat exchanger blows cold outside air into the ground to make the ground colder, preferably during the night when the outside air is colder than the ground. By using valves, the ventilation air itself does not pass through the intermediate heat exchanger, but directly from the heat recovery installation to the building. If the temperature in the building is too high, then the ventilation air does pass through the additional heat exchanger in order to cool the ventilation air with the cold stored in the ground, as long as the ground is sufficiently cold.

In another application of the present invention, a fourth channel layer (heat-storage transport channel layer) is provided on the inside of the channel plate through which a heat-storage transport medium flows, which exchanges heat with the (sun)light heat of the (sun)light absorber. If the interior of the building is sufficiently warm in winter and there is (sun)light heat left over, then, via a circulation circuit with a pump or fan, heat transport medium is pumped around via the heat transport medium supply header, channel plate, heat transport medium discharge header and a heat-storage system. The excess heat is then stored in the heat-storage system.

The heat-storage system used is preferably the ground which is present under the building. In this case, water is preferably used as heat transport medium, with the heat exchange with the ground being achieved by means of U-shaped tubes which are arranged vertically in the ground and through which water is circulated. Preferably, tubes are used which surround a single piece of ground like a vertical cage. The tubes are connected to collecting pipes which are connected to the corresponding headers of the channel plates. Due to the high efficiency of the heat recovery installation, it suffices to store heat or cold for approximately one month and the same piece of ground can be used as a heat store in winter and a cold store in summer.

If the heat store is full in winter and the temperature in the building is sufficiently high or the temperature in the heat recovery installation is too high, then the latter is covered by lowering a sunlight-reflecting layer over the installation.

In winter, the cold fresh ventilation air is heated by the hot used air and/or by the heat of the sun and/or the heat of the heat store. If the temperature in the building is sufficiently high, then heat is conveyed to the heat store when there is (sun)light.

In summer, when it is hotter outside than inside the building, the hotter fresh ventilation air is cooled with the colder used air and/or with the cold which is then present in the store when the temperature inside the building becomes too high. If the outside air is colder than the store in summer, then, if the temperature in the building is sufficiently high, the supply and discharge headers of the fresh and used ventilation air are reversed, so that the fresh outside air flows directly past the channel of the heat transport medium and can thus provide more cold to the store.

The operation of the heat recovery installation depends on the outside temperature, the temperature in the building, the temperature of the store in the ground and the presence of (sun)light. In order to circulate the ventilation air, one or two fans are provided, which pump the fresh and, if desired, the used ventilation air, and a pump or fan is provided which circulates the heat transport medium between the heat recovery installation and the heat and cold store.

In addition, valves are provided in order to be able to reverse the direction of flow of the fresh air and the used air in the heat recovery installation.

Before the winter months begin, the heat store under the building is full and has been heated up to its maximum temperature of approximately 30 to 60° C. using (sun)light which has shone on the heat recovery installation for approximately one month before the winter season. If, during filling of the store, the temperature in the building is too high, then the heat recovery is short-circuited by supplying fresh outside air directly to the building by means of valves, so that the heat transport medium can have a higher temperature than the air in the building. In that case, circulation only takes place if the temperature of the heat transport medium is higher than the temperature of the store.

If, mainly during the winter, the temperature in the building is lower than desired and the temperature of the store is higher than the temperature in the building, the circulation of the heat transport medium is then switched on in order to provide the fresh ventilation air with additional heat from the heat store. If the temperature of the store then becomes lower than the temperature in the building, the building is then heated by gas or electric heaters. If there is heat left over, for example from (sun)light, when the temperature in the building is too high, then the resulting excess heat will be taken to the heat store by switching on the circulation of the heat transport medium, provided the temperature of the transport medium in the heat recovery installation is higher than the temperature of the heat store.

During normal operation outside the winter months, the fresh ventilation air is heated or cooled by the used ventilation air, depending on the outside temperature, and the heat content of the building is able to store any additional heat from (sun)light. In principle, the heat recovery installation is screened from (sun)light outside the winter months. Approximately one month before the start of the summer season, the cold storage under the building is full and it has been cooled to the lowest possible temperature of approximately 5 to 15° C. This is achieved by reversing the direction of flow of the heat recovery during cold weather (preferably at night) following the winter months and before the summer season, so that the heat transport medium can be cooled using the still cool fresh outside air. If, during filling of the store, the temperature in the building is too low, then the circulation of the heat transport medium has to be stopped and, if desired, if a certain minimum is exceeded, the additional heaters have to be switched on or, if there is (sun)light, the sunlight cover is removed from the heat recovery installation in order thereby to heat up the fresh ventilation air.

If, during the summer season, the temperature in the building is too high, then the circulation of the heat transport medium is switched on if the temperature of the heat store is lower than the temperature in the building and the supply of fresh outside air is cooled. If the temperature in the building exceeds a certain maximum value, then the cooling installation, if present, may be switched on.

In another embodiment of the present invention, the three-channel plate is completely transparent. The heat recovery installation is then arranged as a highly efficient insulating window in a south-facing wall or roof of the building. The installation then provides the building with light and, if desired, with passive heat, and simultaneously, depending on the season, cold or heat is recovered from the used ventilation air. Should the temperature in the building still be too low during the winter months, then an electric heater or fuel heater can be used for additional heating. If the temperature in the building is too high or the installation too hot, then a (sun) light-reflecting layer is lowered over the installation. If the temperature in the building should then still be too high, a cooling installation is switched on, if desired.

In another embodiment of the present invention, the channel plate is made of a very inexpensive non-transparent material (paper or plastic) and in addition to serving as a heat recovery installation also serves as insulation by means of superadiabatic flow of the building situated behind it and, with a layer height (thickness) of approximately 8 cm, is then as effective as glass wool having a layer height (thickness) of approximately 35 cm. If the temperature in the building becomes too low during the winter months, an electric heater or fuel heater can be used for additional heating. If the temperature in the building becomes too high, a cooling installation can be switched on, if desired.

In one embodiment of the present invention, the channels are folded in concertina-like fashion from a transparent plastic sheet, preferably made of polycarbonate or plexiglass. Subsequently, separately produced air supply and discharge channels provided with a perforated plate (wall) on one side are pushed between the folds and attached by welding or gluing to produce a three-channel plate. If an additional channel for a heat transport medium, if present, is to be produced, this is made from a single-channel plate and attached to the three-channel plate by welding or gluing. The heat-store transport medium channel layer can also be made from a metal, for example from aluminium, resulting in a mechanically stronger channel plate.

In another embodiment of the present invention, a high single-channel plate, preferably made of polycarbonate or plexiglass, is produced by means of extrusion or moulding. Subsequently, the separately produced supply and discharge channels which are provided with perforated plates on one side are pushed into the single-channel plate and attached by welding or gluing to produce a three-channel plate. If an additional channel for a heat transport medium, if present, is to be produced, the produced three-channel plate is attached to a single-channel plate by means of welding or gluing. The channel plate for the transport medium can also be made from a metal, for example from aluminium, resulting in a channel plate which is mechanically stronger overall.

In another embodiment of the present invention a three- or four-channel plate, preferably made from polycarbonate or plexiglass, is produced by extrusion or moulding. The second and third parallel plates, viewed from the outside, are then perforated by providing them with apertures by means of hot pins or laser beams, from the second channel layer, viewed from the outside.

The headers of the abovementioned embodiments are made from moulded or extruded rectangular tubes and provided with apertures which correspond to the positions of the correct individual channels of the three- or four-channel plates to be connected and glued or welded to the three- or four-channel plates.

The optional (sun)light absorber for the abovementioned embodiments is produced by providing the fourth parallel plate with a sunlight-absorbing layer by a gluing, spraying, deposition or vapour-deposition process.

The optional spectral-selective layer for preventing radiation losses with the abovementioned embodiments is arranged on the first parallel plate by the application of a thin metal layer by a deposition or vapour-deposition process or by gluing a film with a thin layer of metal thereto.

BRIEF DESCRIPTION OF THE DRAWINGS

Further advantages and features of the present invention will be explained with reference to the attached figures, in which:

FIGS. 1 and 2 show an application of the heat recovery installation according to the present invention;

FIGS. 17 and 18 show a second embodiment of the heat recovery installation according to the present invention;

FIGS. 19 and 20 show a third embodiment of the heat recovery installation according to the present invention;

DETAILED DESCRIPTION OF THE INVENTION

Figure 3:
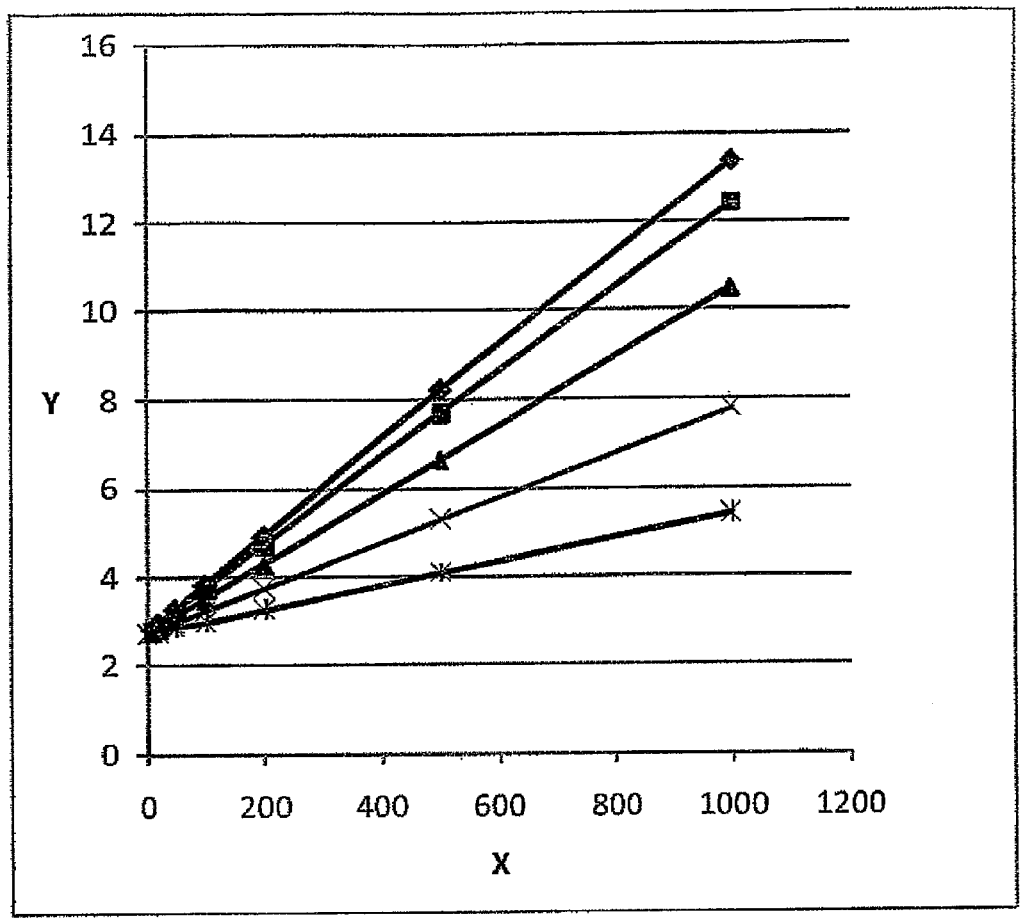
FIG. 3 shows the capacity of the heat recovery installation according to the present invention.

In the following, the outside is indicated by a sun and identical parts are denoted by the same reference numerals in accordance with the following list:

1 (three-)channel plate
2 first supply and discharge channel layer
3 heat recovery channel layer
4 second supply and discharge channel layer
5 used-air supply header
6 used-air discharge header
7 fresh-air supply header
8 fresh-air discharge header
9 sealing plate
10 partitions 11 used air
12 used-air supply apertures
13 used-air supply channels
14 third plate
15 used-air heat recovery channels
16 second plate
17 used-air discharge channels
18 used-air discharge apertures
19 fresh air
20 fresh-air supply apertures
21 fresh-air supply channels
22 fresh-air heat recovery channels
23 fresh-air discharge channels
24 fresh-air discharge apertures
25 (sun)light
26 first plate
27 spectral-selective layer
28 (sun)light-absorbing layer
29 fourth plate
30 main header apertures
31 main used-air supply header
32 main used-air discharge header
33 main fresh-air supply header
34 main fresh-air discharge header
35 heat transport medium channel layer
36 heat transport medium supply header
37 heat transport medium
38 heat transport medium channels
39 heat transport medium discharge header
40 main heat transport medium supply header
41 main heat transport medium discharge header
42 heat recovery installation
43 building
44 heat or cold store
45 air filter
46 fan
47 heat exchanger
48 ventilation opening
49 air filter
50 fan
51 pump
52 distribution pipe
53 U-shaped tubes
54 screen
55 cooling fan
56 cooling shut-off valves
57 shut-off valves
58 supply pipe
59 bypass
60 inverter circuit
61 used-air discharge
62 shut-off valve
63 shut-off valve
64 prefabricated blanks
65 heat transport medium supply apertures
66 heat transport medium discharge apertures FIG. 1 shows an application of a heat recovery installation according to the present invention and FIG. 2 shows a detail thereof for the sake of clarity in an exploded view. The three-channel plate 1 consists of a first supply and discharge channel layer 2, a heat recovery channel layer 3, a second supply and discharge layer 4, a used-air supply header 5, a used-air discharge header 6, a fresh-air supply header 7 and a fresh-air discharge header 8. For the sake of clarity, FIG. 2 shows a detail of the three-channel plate along the partitions 10 in exploded view.

By means of a fan (not shown) in the used-air supply header, the used air 11 from a building (not shown) flows through the used-air supply apertures 12 to the alternately arranged used-air supply channels 13 in the second supply and discharge channel layer 4. Subsequently, the used air 11 flows in the used-air supply channels 13 parallel to the surface of the three-channel plate 1 to and through the perforations of the third plate 14 to the alternately arranged used-air heat recovery channels 15 in the heat recovery channel layer 3. Then, the used air 11 flows at right angles to the surface of the three-channel plate 1 and between the partitions 10 in the direction of the second plate 16. Subsequently, the used air 11 flows through the perforations of the second plate 16 to the used-air discharge channels 17, which are alternately arranged in the first supply and discharge channel layer 2. In the used-air discharge channels 17, the used air 11 flows parallel to the surface of the three-channel plate 1 to the used-air discharge header 6 through the used-air discharge apertures 18. The used air 11 collected by the used-air discharge header 6 is then taken outside.

The fresh air 19 flows into the fresh-air supply header 7 through the fresh-air supply apertures 20 to the alternately arranged fresh-air supply channels 21 in the first supply and discharge channel layer 2. Next, the fresh air 19 flows into the fresh-air supply channels 21 parallel to the surface of the three-channel plate 1 to and through the perforations of the second plate 16 to the alternately arranged fresh-air heat recovery channels 22 in the heat recovery channel layer 3. Subsequently, the fresh air 19 flows at right angles to the surface of the three-channel plate 1 and between the partitions 10 in the direction of the third plate 14 and thus in a direction opposite to the used air 11 in the heat recovery channel layer 3. Then, the fresh air 19 flows through the perforations of the third plate 14 to the fresh-air discharge channels 23, which are alternately arranged in the second supply and discharge channel layer 4. In the fresh-air discharge channels 23, the fresh air 19 flows parallel to the surface of the three-channel plate 1 to the fresh-air discharge header 8 through the fresh-air discharge apertures 24. The fresh air 19 collected by the fresh-air discharge header 8 is then taken to the ventilation system (not shown) of the building (not shown).

In the heat recovery channel layer 3, used air 11 flows along the partitions 10 on one side and on the other side fresh air 19 flows in the opposite direction, exchanging heat via the thin partitions 10 if there is a temperature difference. If the used air 11 is hotter than the fresh air 19, mainly in winter, then heat in the used air 11, which comes out of the building (not shown), is recovered to the fresh air 19, which then flows back again to the building (not shown). If the used air 11 is colder than the fresh air 19, mainly in summer when the weather is considered too hot by humans, the then useful cold in the used air 11 coming from the building (not shown) is then recovered to the fresh air 19, which then flows back again to the building (not shown). In order to ensure a good laminar heat transfer, the individual recovery channels 15 and 22 have a width of approximately 0.2 to 1 cm between the partitions 10.

At a width of the individual channels 15 and 22 of b=5 mm, there are $n_s$=200 partitions 10 across a width $b_k$=1 m of the three-channel plate 1, and at a height $h_k$=5 cm of the channels 15 and 22 and a length $L_k$=1 m of the three-channel plate 1 the heat-flow surface area is 10 m$^2$ per m$^2$ three-channel plate 1, i.e. $n_p$=partition surface/channel plate surface=10 times the surface of the three-channel plate 1 itself. The heat resistance of the partitions 10 having a wall thickness t=0.05 mm and a thermal conduction coefficient $\lambda_s$=0.23 W/mK is $R_s$=0=0.00005/0.23=0.000217 Km$^2$/W and of the air 11 and 19 from and to the partitions 10 at a Nusselt number Nu=12;

$R_1=b/(\lambda_1\ Nu)=0.005/(0.024\times12)=0.0174\ Km^2/W$. In total, the specific heat is then $k_p=n_p/(R_s+2\ R_1)=10/(0.000217+2\times0.0174)=286\ W/Km^2$ through the partitions 10 per $m^2$ three-channel plate 1. At a ventilation flow rate of, for example, 500 $m^3$/hour and a nominal temperature difference in the winter between the inside and the outside of, for example, $\Delta T=20$ K, it is possible to recover $Q_{tw}=2777$ W of heat. In order to collect sufficient (sun)light 25, a three-channel plate 1 is required with a surface $A=10\ m^2$, for example, which can potentially recover a heat of $K_p=A\ k_p=10\times286=2860$ W/K, so that the temperature difference across the partitions is on average $\Delta T_s=Q_{tw}/K_p=2777/2860=0.98$ K and the recovery efficiency:

$$\eta\approx100(1-\Delta T_s/\Delta T)=100(1-0.98/20)>95\%.$$

When there is a temperature difference between the inside and the outside, parasitic heat is lost through the three-channel plate 1 as a result of conduction of the air 11 and 19 flowing into the plate 1, as a result of conduction in the partitions 10 and as a result of radiation. Due to the operating mode, there is hardly any insulation in the supply and discharge channel layers 2 and 4 and insulation has to be performed completely by the heat recovery channel layer 3. The superadiabatic flow in the heat recovery channel layer is determined by the Péclet number (Pe), which is dependent on the density $\rho=1.2\ kg/m^3$, the thermal capacity $C_p=1000$ J/kg and the thermal conduction $\lambda=0.024$ W/Km of the air, the typical length (here the height $h_k$ of the channels 15 and 22) and the flow velocity v according to:

$$Pe=h_k v \rho C_p/\lambda.$$

The flow velocity in the channels 15 and 22 depends on the surface of the three-channel plate 1 and the ventilation flow rate. In the case of the example used, these are 10 $m^2$ and 500 $m^3$/hour, respectively. The flow velocity in the channels 15 and 22 is then 500/5=100 m/hour or 0.069 cm/s. At a Pe=10, a typical length or channel height $h_k=10\times0.024/(0.0069\times1.2\times1000)=0.72$ cm is then required. A figure of approximately 5 cm was chosen as a conservative estimate, which corresponds to the chosen perpendicular channel height $h_k$ of the channels 15 and 22, in which heat recovery takes place and Pe is much greater than 10. At a Pe=10, the effective conduction coefficient of air $\lambda_e=0.002$ W/Km and the heat losses by the air are:

$$k_{v1}=\lambda_e/h_k=0.002/0.05=0.04\ W/Km^2.$$

Apart from heat losses by the air, heat is also lost in the partitions 10, which are therefore made of a material which is thin (t=0.04 mm), high ($h_k=5$ cm) and has poor conductivity, such as plastic ($\lambda_s=0.23$ W/mK). At an individual channel width of b=5 mm, i.e. $n_s=200$ partitions/m, the heat loss per $m^2$ three-channel plate 1 is:

$$k_{vw}=n_s t\lambda_s/h_k=200\times0.00004\times0.23/0.05=0.036\ W/Km^2.$$

Heat is also lost through radiation, which is reduced by providing the first parallel plate 26 with a spectral-selective reflection layer 27, which reflects approximately 99% of infra-red light and largely allow visible light through. These selective layers are also used in high-efficiency double glazing. At an emission coefficient of $\epsilon_e=0.01$ and a temperature difference $\Delta T$ of nominally 20 K, these losses are:

$$k_{vs}=\epsilon_e\sigma(T_h^4-T_c^4)/\Delta T=0.01\times5.7\ 10^{-8}(300^4-280^4)/20=0.055\ W/Km^2$$

The total loss by the heat recovery channel layer 3 is then approximately $k_{vt}=0.13\ W/Km^2$, which corresponds to approximately 35 cm glass wool. Compared thereto, a high efficiency $HR^{++}$-glazing with a $k_{vt}=1.1\ W/Km^2$ is approximately 9 times worse than that of the known channel plate 1.7 $W/Km^2$ and 13 times worse than with the three-channel plate of the present invention.

Effectively, nominally, with a surface of the three-channel plate 1; $A_k=10\ m^2$, of the 2777 W heat which is present, at a $\Delta T=20$ K in the ventilation air, only $(1-\eta/100)Q_{tw}=0.05\times2777=138$ W is thus not recovered and 2639 W is. In relation to the small reduction in the recovered gain, the parasitic heat losses of the installation: $Q_{vt}=A_k k_{vt}\Delta T=10\times0.13\times20=26$ W are negligible. This means that for cost reasons, the partitions 10 may be thicker (t=0.1-0.2 mm), the spectral-selective layer 27 may have a larger emission coefficient ($\epsilon_e=0.02-0.1$) and/or the Péclet number may be smaller (Pe=3-10).

(Sun)light 25 shines through the transparent three-channel plate 1 on the (sun)light-absorbing layer 28 on the fourth plate 29 of the three-channel plate 1 and heats, mainly in winter, the used air 11 and the fresh air 19 in the channels 13 and 23, respectively. The (sun)light heat absorbed by the fresh air 19 then flows directly to the building (not shown) and the (sun)light heat absorbed by the used air 11 is recovered in the heat recovery channel layer 3 and then transferred to the fresh air 19 with a small loss.

In order to prevent overheating and during cooling mode, i.e. mainly during summer, the three-channel plate 1 is screened against (sun)light 25 by a cover (not shown) and, depending on the outside temperature, the fresh air 19 is cooled or heated. In order to improve insulation, the three-channel plate 1 is also covered by the cover (not shown) when there is little light (at night).

FIG. 3 shows the capacity of the present invention to recover heat from used ventilation air and convert (sun)light into useful heat for a building on the Y axis in kW and, depending on the intensity of the (sun)light on the X axis in $W/m^2$ and the increased emission coefficient as a result of soiling of an, in this example, three-channel plate of 16 $m^2$ at a ventilation flow rate of 500 $m^3$/h, an outside temperature of 0° C. and an inside temperature of 20° C. At legend 1, the effective emission coefficient is 0.03 (clean internal surface). At legend 2, this is 0.05 (slightly soiled), at legend 3, this is 0.1 (soiled), at legend 4, this is 0.2 (heavily soiled) and at legend 5, this is 0.5 (very heavily soiled). When there is no light intensity or no transparent material, heat is only recovered from the ventilation air. Even at low intensity (<100 $W/m^2$) energy is still recovered from the light. Integrated over time, this intensity which is common in winter still represents a significant amount of energy, which can hardly be converted into useful heat by known solar collectors under these circumstances.

Figures 4, 5:
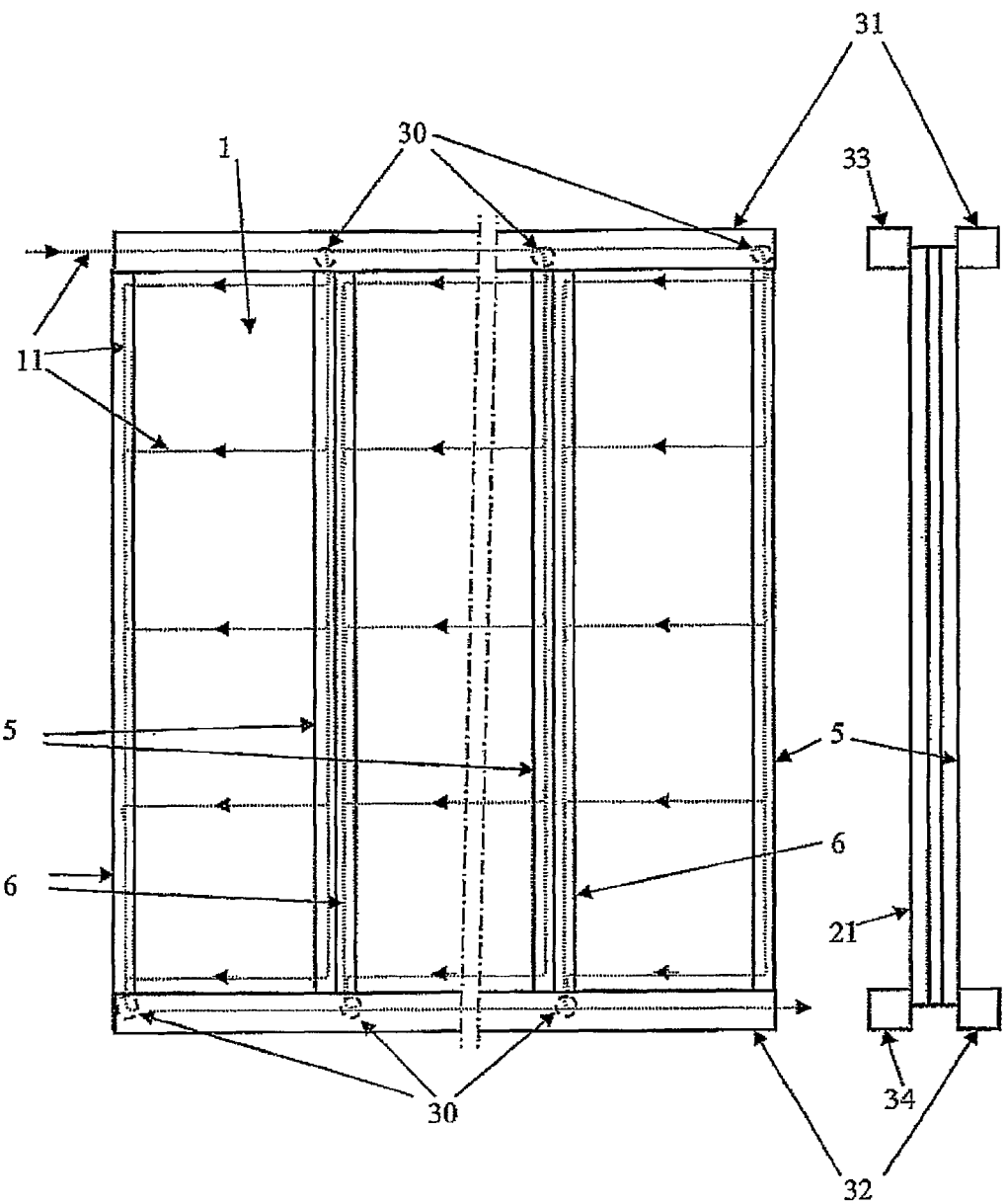
FIGS. 4 and 5 show a second application of the heat recovery installation according to the present invention.

FIG. 4 shows a top view and FIG. 5 a side view of a second application of a heat recovery installation, composed of several three-channel plates 1 according to FIG. 1, whose used-air supply headers 5 are connected to the main used-air supply header 31 and whose used-air discharge headers 6 are connected to the main used-air discharge header 32. Furthermore, the fresh-air supply headers 7 are connected to the main fresh-air supply header 33 and the fresh-air discharge headers 8 to the main fresh-air discharge header 34. In this case, the air from and to the main headers 31, 32, 33 and 34 flows through the main header apertures 30.

Figure 6:
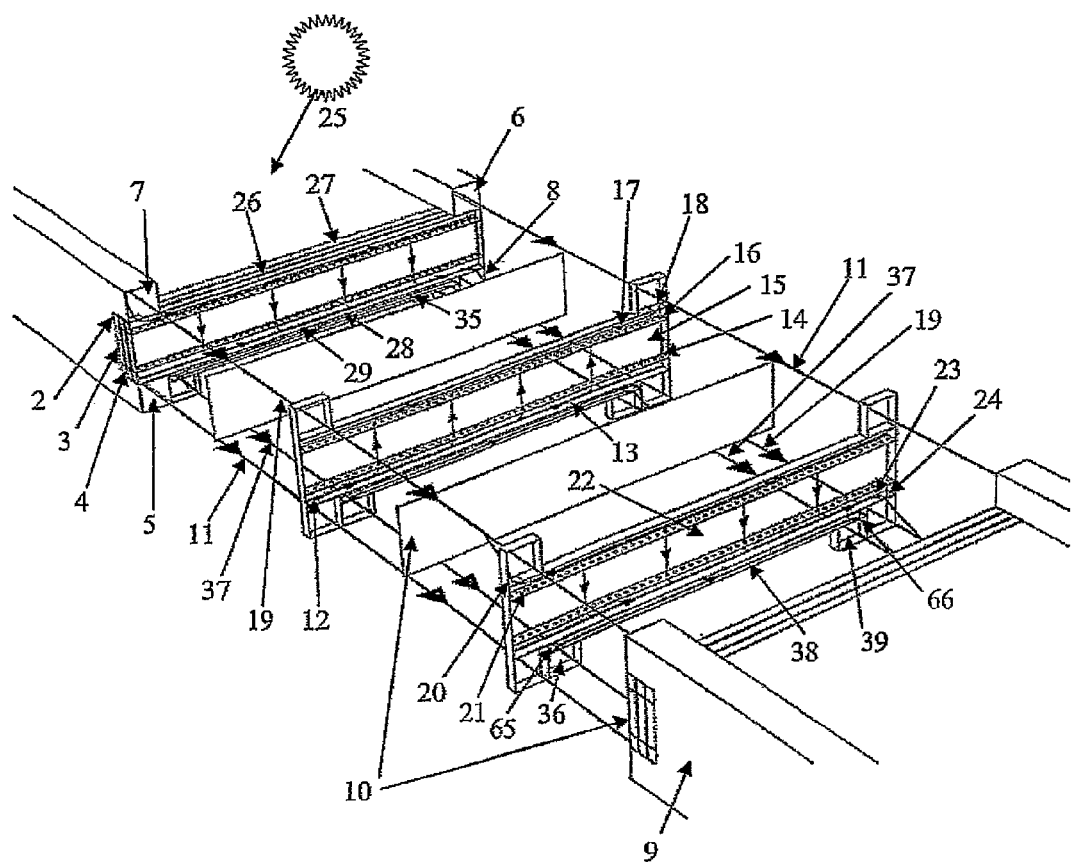
FIG. 6 shows a third application of the heat recovery installation according to the present invention.

FIG. 6 shows a third application of a heat recovery installation according to the present invention, in which a heat transport medium channel layer 35 is added to the three-channel plate 1 (as illustrated in FIG. 2). Using a pump or fan (not shown), the heat transport medium 37 can be pumped from the heat store (not shown) to the heat transport medium supply header 36. From the header 36, the heat transport medium 37 can be distributed via the heat transport medium supply apertures 65 over the heat transport medium channels 38 and can then, through the heat transport medium discharge apertures 66, flow to the heat transport medium discharge header 39 where the heat transport medium 37 can be collected again. Subsequently, the heat transport medium can flow back to the heat store (not shown). The heat store medium 37 comes into contact with the (sun)light-absorbing layer 28 and is heated by (sun)light 25 when this shines on this layer 28. If the fresh air 19, mainly in winter, has been heated sufficiently, the heat transport medium 37 is pumped around and the heat store (not shown) is heated up. If the fresh air 19, mainly in winter, is too cold, then, provided there is sufficient heat in the heat store, the heat transport medium 37 is likewise pumped around in order to supply heat from the heat store to the fresh air 19.

If the fresh air 19, mainly in summer, has been cooled sufficiently, then the heat transport medium 37 is pumped around and the heat store (not shown) is cooled. If the fresh air 19, mainly in summer, is too hot, then, provided there is sufficient cold in the heat store, the heat transport medium 37 is likewise pumped around in order to supply cold to the fresh air 19.

Figures 7, 8:
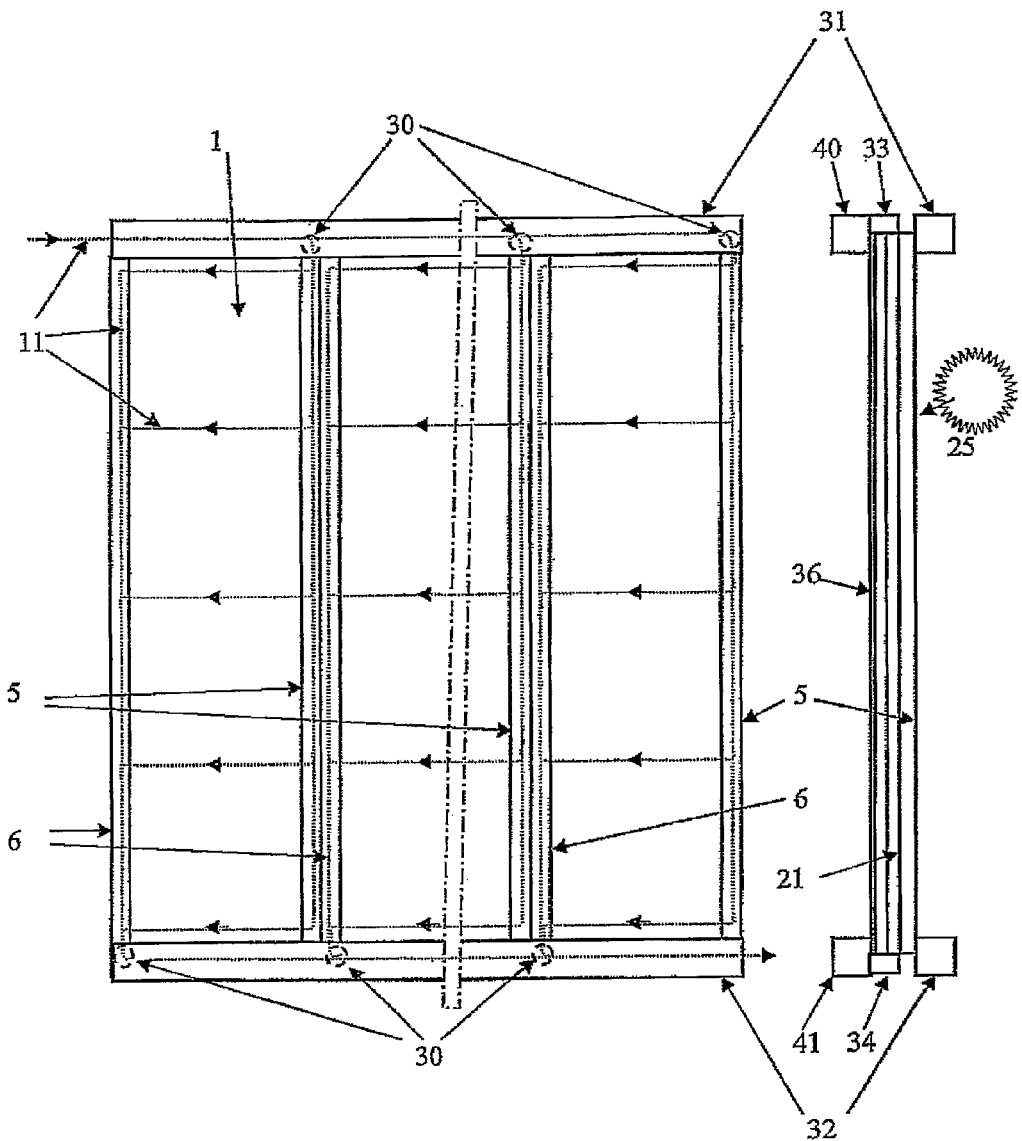
FIGS. 7 and 8 show a fourth application of the heat recovery installation according to the present invention.

FIG. 7 shows a top view and FIG. 8 a side view of a fourth application of a heat recovery installation, according to the present invention, composed of several channel plates 1 according to FIG. 6, whose used-air supply headers 5 are connected to the main used-air supply header 31 and whose used-air discharge headers 6 are connected to the main used-air discharge header 32. Furthermore, the fresh-air supply headers 7 are connected to the main fresh-air supply header 33 and the fresh-air discharge headers 8 to the main fresh-air discharge header 34. In addition, the heat transport medium supply headers 36 are connected to the main heat transport medium supply header 40 and the heat transport medium discharge headers 39 are connected to the main heat transport medium discharge header 41.

In this case, the air 11 and 19 and the heat transport medium 37 from and to the main headers 31, 32, 33, 34, 40 and 41 flows through the main header apertures 30.

Figure 9:
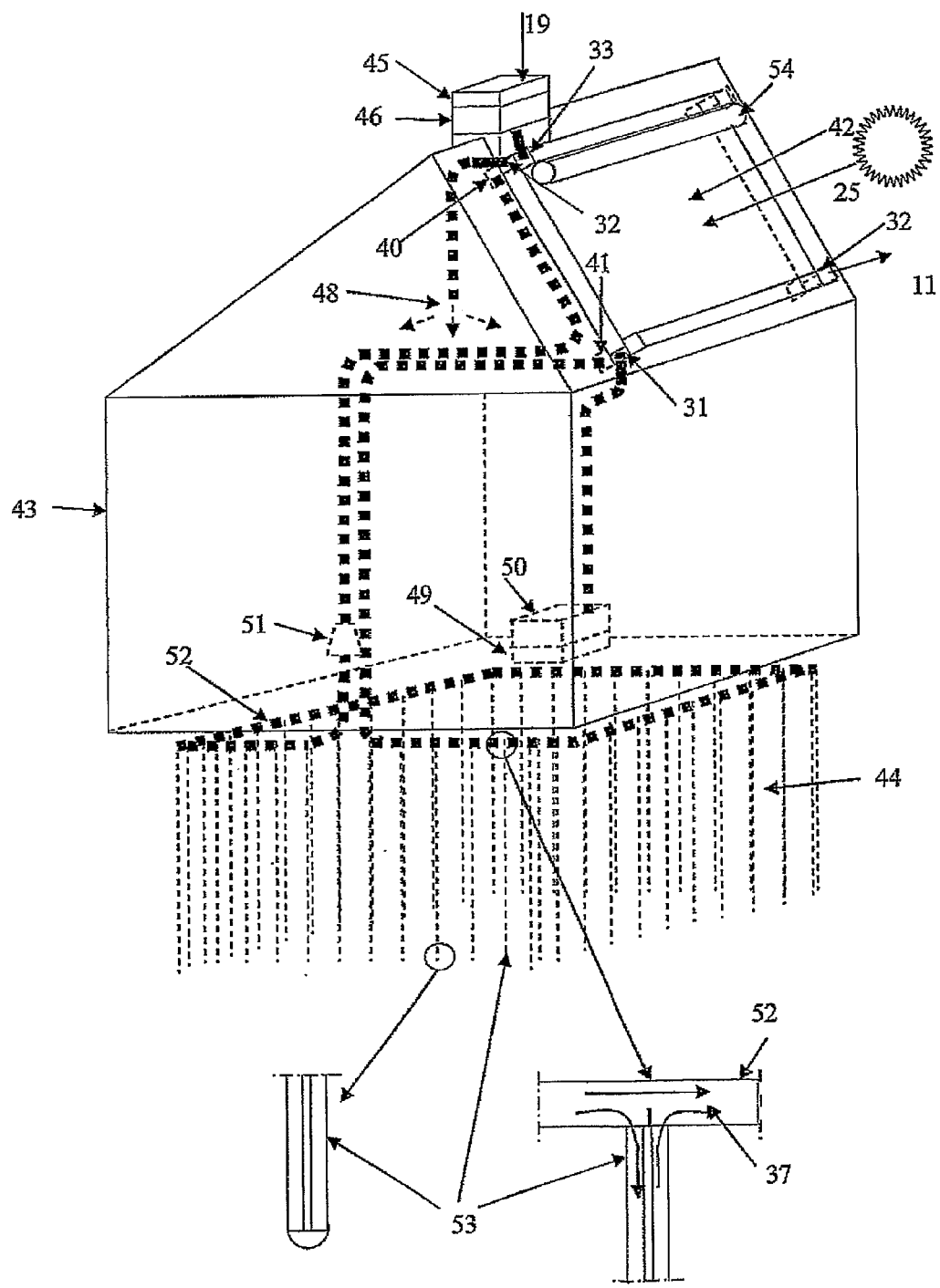
FIG. 9 shows a fifth application of the heat recovery installation according to the present invention.

FIG. 9 shows a fifth application of the heat recovery installation 42 according to FIG. 1 or FIG. 4, illustrating circuit together with the building 43 to be ventilated and the heat or cold store 44. Using a fan 46, the fresh ventilation air 19 is pumped to the (main) fresh-air supply header 33 by an air filter 45. In the heat recovery installation 42, it flows to the fresh-air heat recovery channels 22 illustrated in FIG. 2 and then flows to the (main) fresh-air discharge header 33 to the heat exchanger 47 underneath the building 43, where it can exchange heat with a heat transport medium 37 in the heat exchanger 47 in order to cool or heat the fresh air 19. From the heat exchanger 47, the fresh ventilation air 19 then flows to the ventilation opening 48 in the building 43. The used air 11 is pumped to the (main) used-air supply header 31 by an air filter 49, optionally with a second fan 50, following which it flows through the used-air heat recovery channels 15 illustrated in FIG. 2 and there exchanges heat with the fresh ventilation air 19 in the fresh-air heat recovery channels 22 illustrated in FIG. 2. Next, the used air 11 flows to the outside through (main) used-air discharge header 32.

The heat transport medium 37 is pumped around by pump 51 to the distribution pipes 52 of the heat or cold store 44 and back again to the pump 51 via the heat exchanger 47.

The distribution pipes 52 distribute the heat transport medium over U-shaped tubes 53, which are situated in the ground below the building 43 and exchange heat with this ground, which forms the heat or cold store 44. If no heat from (sun)light is required, the heat recovery installation 42 is covered by, for example, covering it with a rolling screen 54. Before or during the summer season, the cooling fan 55 is switched on, the cooling shut-off valves 56 are opened and the shut-off valves 57 are closed; if the temperature in the ground store 44 is higher than the outside temperature, cold outside air flows to the heat exchanger 47, which then cools the ground 44 by means of the heat transport medium 37.

In the supply pipe 58 for fresh air 19 to the building 43, a bypass 59 is provided, through which the air can flow directly to the ventilation opening 48 in the building, if this air does not have to be additionally cooled or heated by the heat or cold store 44 and if the shut-off valves 57 are closed.

Figure 10:
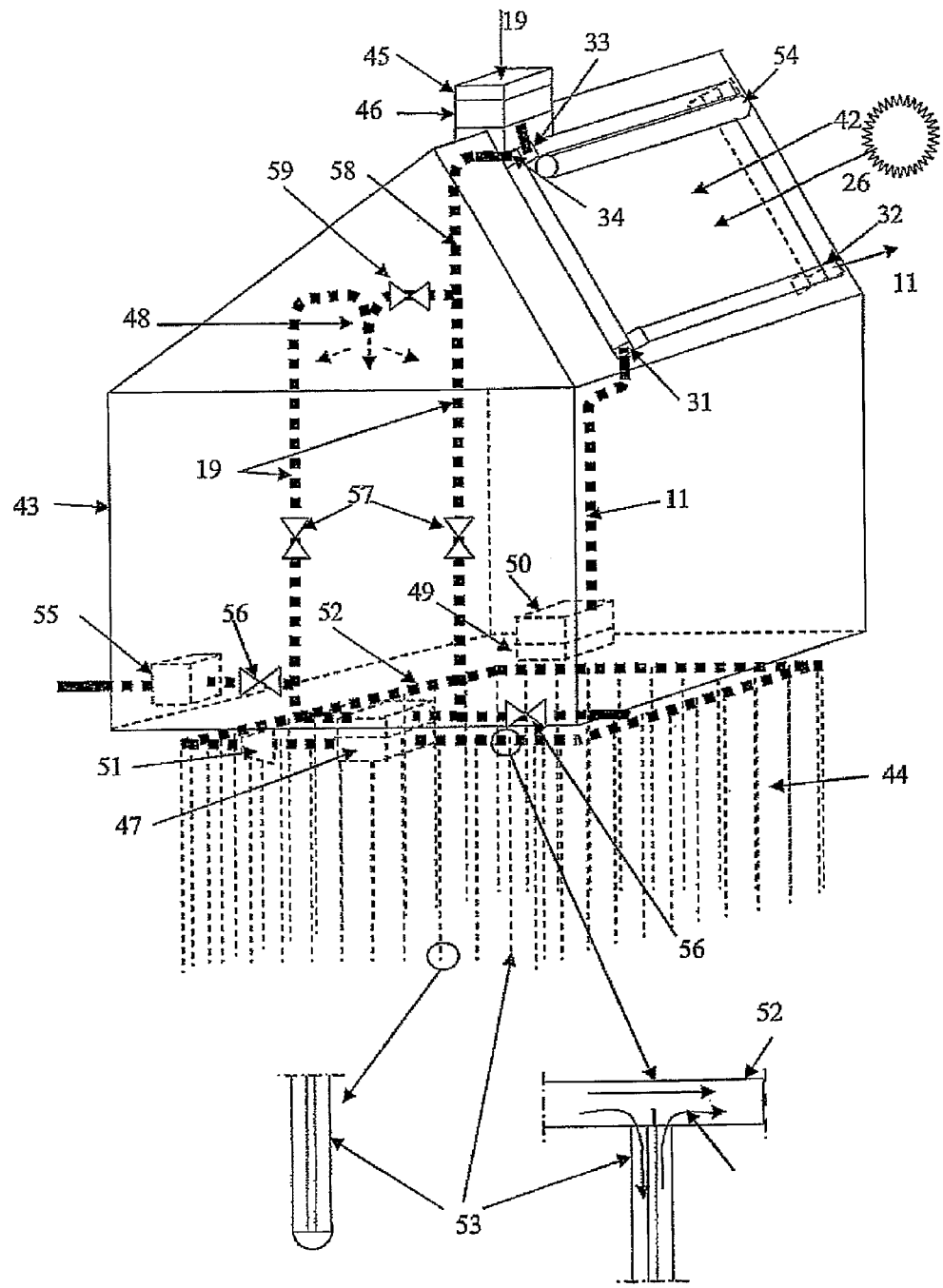
FIG. 10 shows a sixth application of the heat recovery installation according to the present invention.

FIG. 10 shows a sixth application of the heat recovery installation 42 according to FIG. 5 or FIG. 6, illustrating the circuit together with the building 43 to be ventilated and the heat or cold store 44 can be seen. The fresh ventilation air 19 is pumped to the (main) fresh-air supply header 31 by an air filter 45 with a fan 46. In the heat recovery installation 42, it flows to the fresh-air heat recovery channels 22 illustrated in FIG. 2 and thereafter flows to the (main) fresh-air discharge header 34 to the ventilation opening 48 in the building 43. The used air 11 is pumped to the (main) used-air supply header 31 by an air filter 45, optionally with a second fan 46, following which it flows through the used-air heat recovery channels 15 illustrated in FIG. 22 and there exchanges heat with the fresh ventilation air in the fresh-air heat recovery channels 22. Next, the used air flows to the outside through (main) used-air discharge header 32.

The heat transport medium 37 is pumped around by pump 51 to the (main) heat transport supply header 40 by the heat recovery installation 42 to the (main) heat transport medium discharge header 41 and from there to the distribution pipes 52 of the heat store 44 back again to the pump 51.

The distribution pipes 52 distribute the heat transport medium 37 over U-shaped tubes 53, which are situated in the ground below the building 43 and exchange heat with this ground, which forms the heat or cold store 44.

If no heat from (sun)light 25 is required, the heat recovery installation 42 is covered by, for example, covering it with a rolling screen 54.

Figure 11:
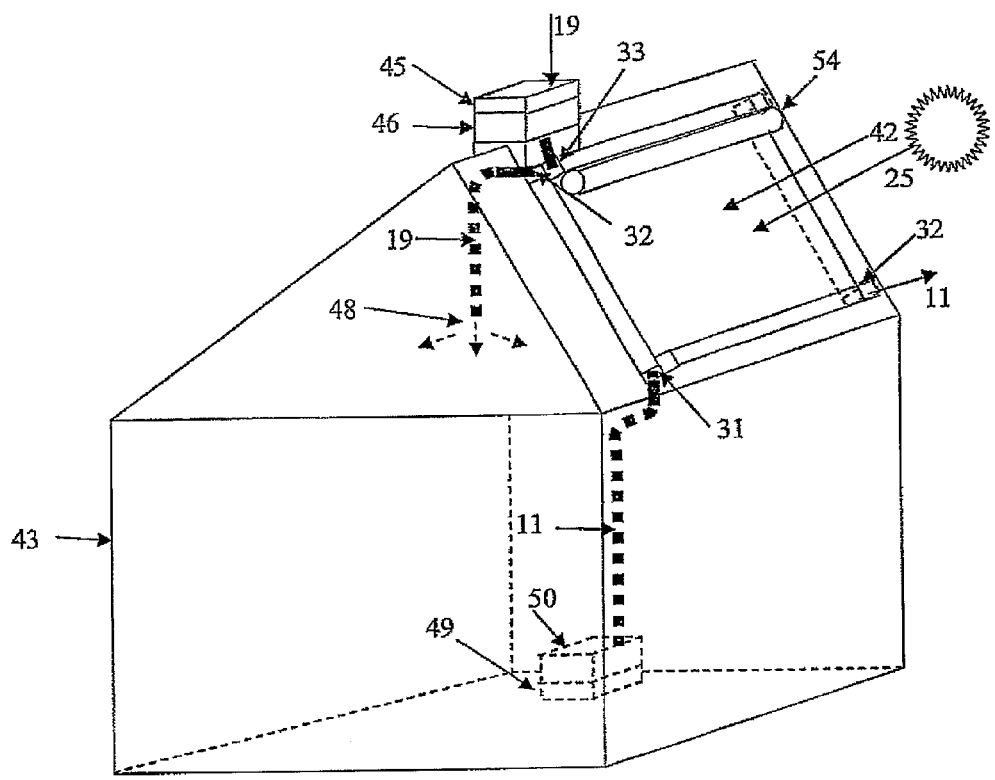
FIG. 11 shows a seventh application of the heat recovery installation according to the present invention.

FIG. 11 shows a seventh application of the heat recovery installation 42 according to FIG. 1 or FIG. 4, illustrating the circuit together with the building 43 to be ventilated without a store. The fresh ventilation air 19 is pumped to the (main) fresh-air supply header 33 by an air filter 45 with a fan 46. In the heat recovery installation 42, it flows to the fresh-air recovery channels 22 illustrated in FIG. 25 and then flows to the (main) fresh-air discharge header 33 to the ventilation opening 48 in the building 43. The used air 11 is pumped by an air filter 49, optionally with a second fan 50, to the (main) used-air supply header 31, following which it flows through the used-air heat recovery channels 15 illustrated in FIG. 2 and there exchanges heat with the fresh ventilation air 19 in the fresh-air heat recovery channels 22. Subsequently, the used air 11 flows to the outside through (main) used-air discharge header 32. Mainly during the winter, additional heat is given off to the ventilation air by the absorbing layer 28 on the fourth plate 29 which is illustrated in FIG. 25 and on which (sun)light 25 shines.

If no heat from (sun)light is required, the heat recovery installation 42 is covered by, for example, covering it with a rolling screen 54.

Figure 12:
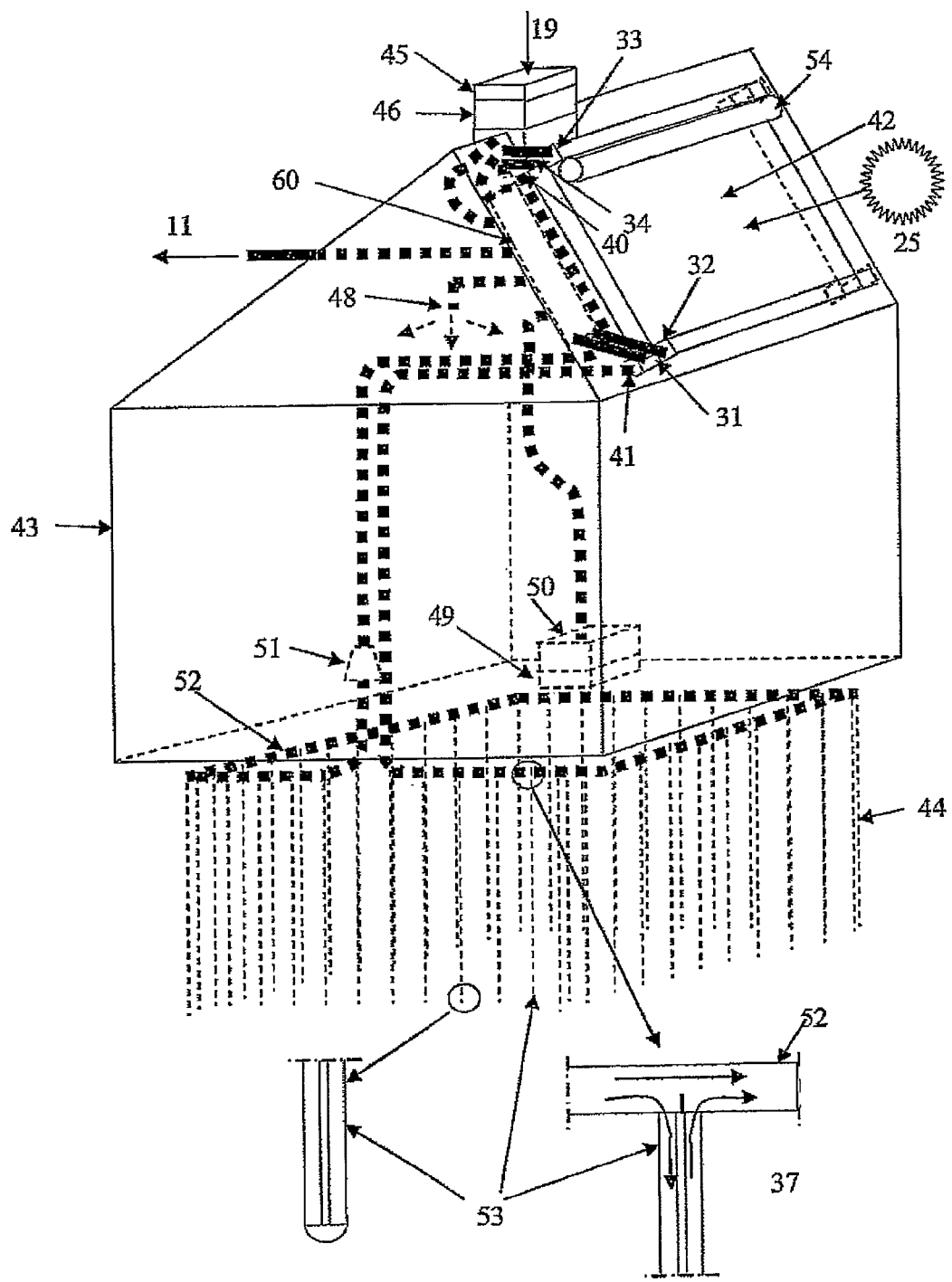
FIG. 12 shows an eighth application of the heat recovery installation according to the present invention.

FIG. 12 shows an eighth application of the heat recovery installation 42 according to FIG. 6 or FIG. 7, illustrating the circuit together with the building 43 to be ventilated and the heat or cold store 44. In order to be able to supply cold to the store 44 before and during the summer season, the installation 42 is provided with a flow inverter 60, the diagram of which is more clearly illustrated in FIG. 13. If the store 44 is not cooled, the inverter 60 is set to the normal position, so that fresh ventilation air 19 is pumped to the (main) fresh-air supply header 33 by an air filter 45 with a fan 46. In the heat recovery installation 42, it then flows to the fresh-air heat recovery channels 22 illustrated in FIG. 2 and thereafter flows to the (main) fresh-air discharge header 34 to the ventilation opening 48 in the building 43. The used air 11 is then pumped to the (main) used-air supply header 31 by an air filter 45, optionally with a second fan 46, after which it flows through the used-air heat recovery channels 15 illustrated in FIG. 2 and there exchanges heat with the fresh ventilation air 19 in the fresh-air heat recovery channels 22. Subsequently, the used air 11 flows to the outside through the (main) used-air discharge header 32.

The heat transport medium 37 is pumped around by pump 51 to (main) heat transport medium supply header 40 by the heat recovery installation 42 to the (main) heat transport medium discharge header 41 and from there to the distribution pipes 52 of the heat store 44 back again to the pump 51.

Figure 13:
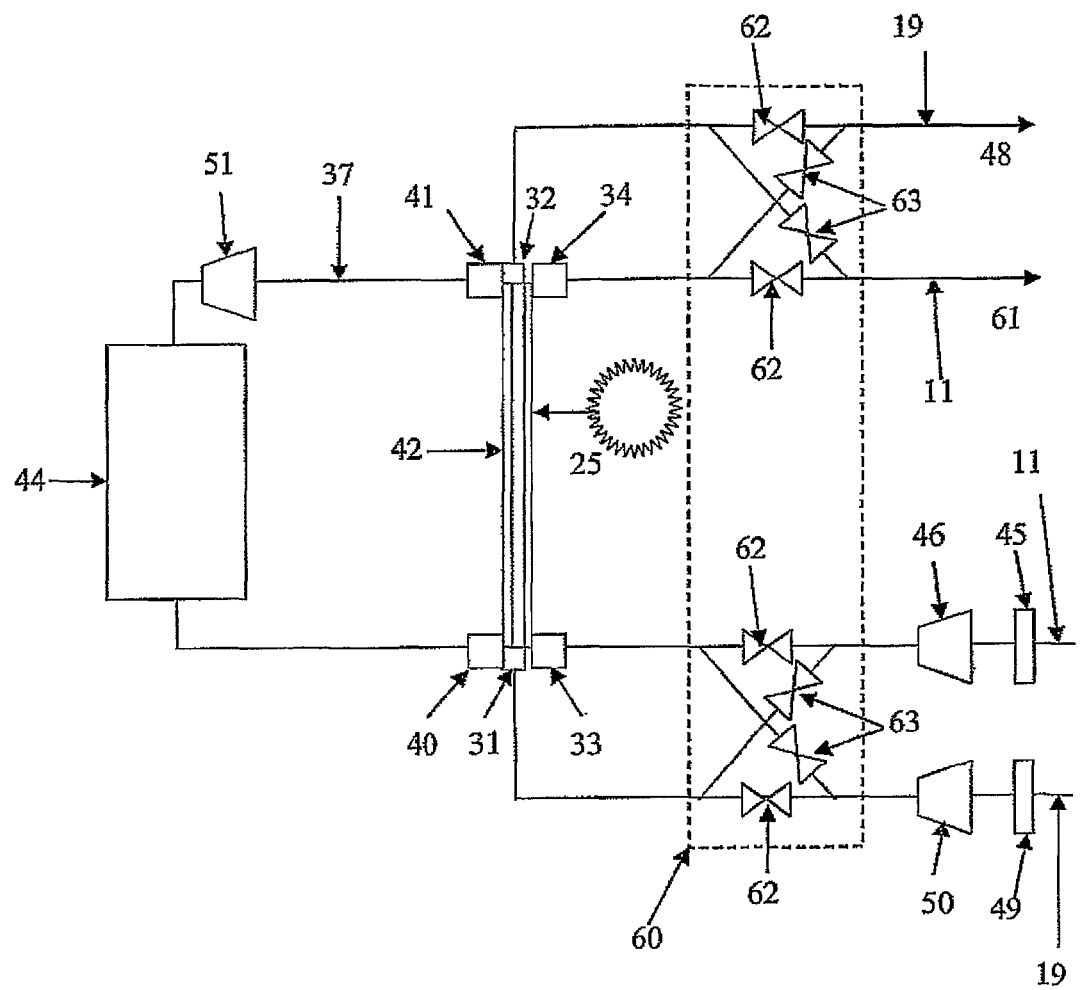
FIG. 13 shows a diagram of the eighth application of the heat recovery installation according to the present invention.

The distribution pipes 52 distribute the heat transport medium 37 over U-shaped tubes 53, which are situated in the ground below the building 43 and exchange heat with this ground, which forms the heat or cold store 44. Before and during the summer season, when the outside air is colder than the store 44, an inverter 60, which is illustrated diagrammatically in FIG. 13, is switched to the cooling position. In this position, the ventilation air in the heat recovery installation 42 flows in the opposite direction to that in the normal position and the heat transport medium 37, which flows from (main) heat transport medium supply header 40 to (main) heat transport medium discharge header 41, becomes cooler, due to the fact that, in this cooling position, cold fresh air 19 and cold used air 11 flow into the second supply and discharge channel layer 4 illustrated in FIG. 4, with which the heat transport medium comes into contact. If the outside air is hotter than the store 44 before or during cooling mode, the inverter 60 is then switched back to the normal position. When the inverter 60 is in the normal position, then the outer channels and headers are at approximately the outside temperature and the inner channels and headers are at the inside temperature, i.e. the insulation is optimal and the thermal losses are minimal. The normal position is therefore preferred. In the cooling position, the insulation of the heat recovery installation 42 is not optimal. However, this situation mainly occurs just before and in the summer months, when insulation and thermal losses do not matter so much.

If no heat from (sun)light is required, the heat recovery installation 42 is covered by, for example, covering it with a rolling screen 54.

FIG. 13 shows a diagram of the eighth application of the heat recovery installation according to FIG. 12, which explains the operation of the inverter 60. The circuit 60 is designed in such a manner that, mainly in winter mode, the fresh ventilation air 19 flows via filter 45 and fan 46 to (main) fresh-air supply header 33 and then via (main) fresh-air discharge header 34 and ventilation opening 48 into the building 43. Subsequently, the used ventilation air 11 is taken by the filter 49 and the fan 50 to the (main) used-air supply header 31, following which the heat is exchanged with the fresh ventilation air 19 in the heat recovery installation 42. Subsequently, the used air 19 is taken outside via the (main) used-air discharge header 32 via the discharge 61. In this case, the shut-off valves 62 are open and the shut-off valves 63 closed. Mainly before and during cooling mode in the summer, when the outside air is colder than the cold store 44, the shut-off valves 62 are closed and the shut-off valves 63 are open. The flow in the heat recovery installation 42 is then reversed and the heat transport medium 37 flows from the (main) heat transport medium supply header 40 to the (main) heat transport medium discharge header 41 and into the heat recovery installation 42 past the then cold second supply and discharge channel layer 4, as a result of which the heat transport medium 37 cools down. This cold is then transferred by means of pump 51 to the cold store 44 and can be used, if the shut-off valves 62 are open and the shut-off valves 63 are closed, to cool the building 43 when the temperature in the building 43 is too high.

Figure 14:
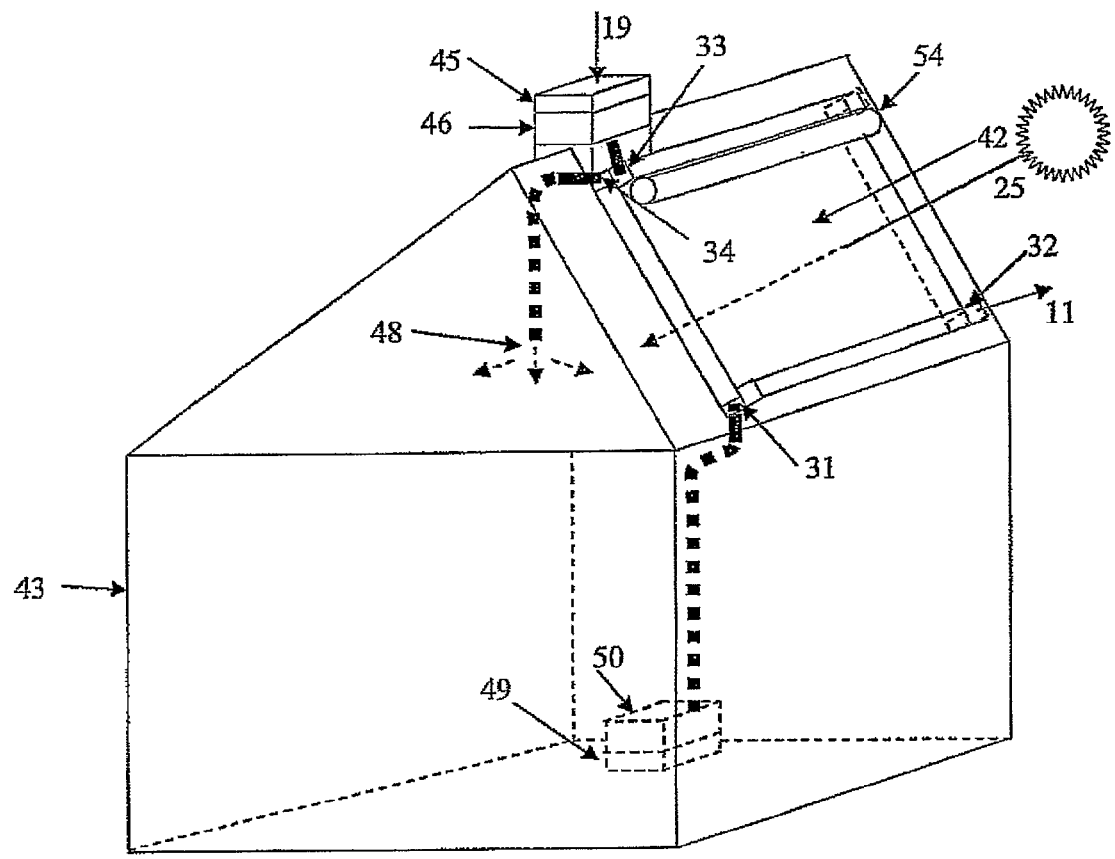
FIG. 14 shows a ninth application of the heat recovery installation according to the present invention.

FIG. 14 shows a ninth application of the heat recovery installation according to FIG. 1 or FIG. 4, illustrating the circuit together with the building 43 to be ventilated without a store, in which the (sun)light 25 shines through the heat recovery installation 42. In this case, the heat recovery installation 42 is placed in a daylight opening of the building 43 like a window, in order to supply the interior of the building 43 with light and passive heat from (sun)light 25 as well. The fresh ventilation air 19 is pumped to the (main) fresh-air supply header 33 by an air filter 45 with a fan 46. In the heat recovery installation 42, it flows to the fresh-air heat recovery channels 22 illustrated in FIG. 2 and then to the (main) fresh-air discharge header 34 and from there to the ventilation opening 48 in the building 43. The used air 11 is pumped to the (main) used-air supply header 31 by an air filter 49, optionally with a second fan 50, following which it flows through the used-air heat recovery channels 15 illustrated in FIG. 2 and there exchanges heat with the fresh ventilation air 19 in the fresh-air heat recovery channels 22. Subsequently, the used air 11 flows to the outside through the (main) used-air discharge header 32. If no heat from (sun)light 25 is required, the heat recovery installation 42 is covered by, for example, covering it with a rolling screen 54.

Figure 15:
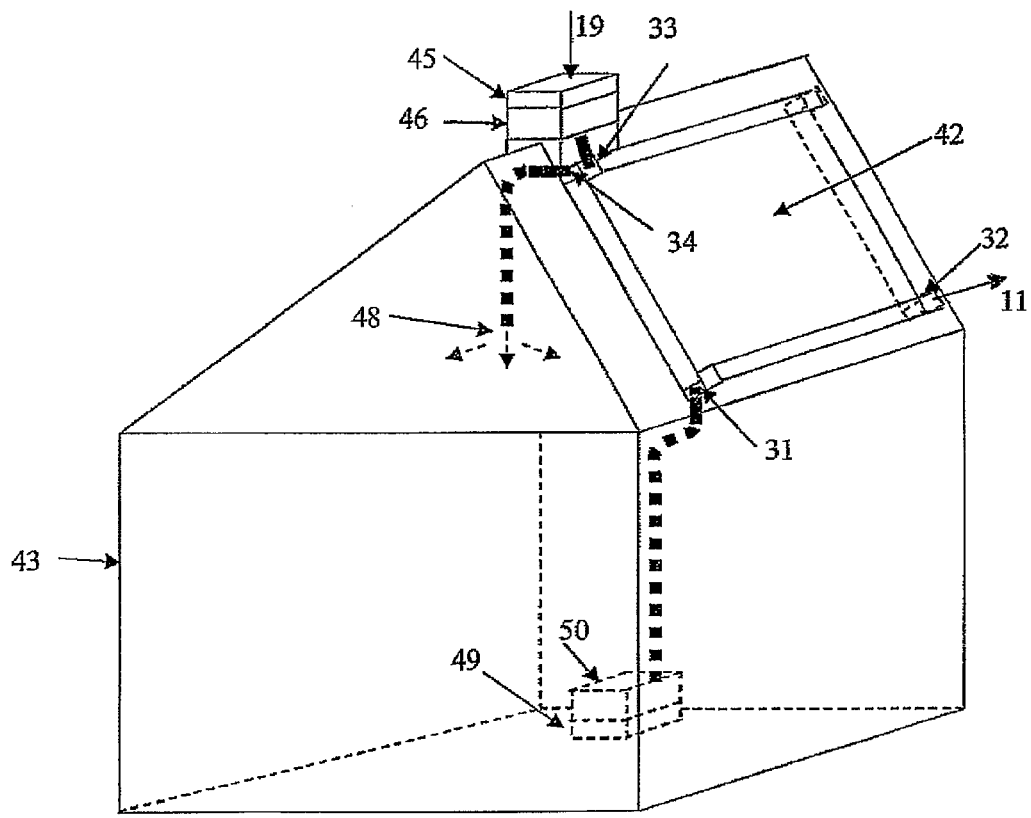
FIG. 15 shows a tenth application of the heat recovery installation according to the present invention.

FIG. 15 shows a tenth application of the heat recovery installation according to FIG. 1 or 4, illustrating the circuit together with the building 43 to be ventilated without a store and collection of heat from (sun)light, in which the channel plate 1 is made from an inexpensive, non-transparent material. The fresh ventilation air 19 is pumped to the (main) fresh-air supply header 33 by an air filter 45 with a fan 46. In the heat recovery installation 42, it flows to the fresh-air heat recovery channels 22 illustrated in FIG. 2 and then flows to the (main) fresh-air discharge header 34 and from there to the ventilation opening 48 in the building 43. The used air is pumped to the (main) used-air supply header 31 by an air filter 49, optionally with a second fan 50, following which it flows through the used-air heat recovery channels 15 illustrated in FIG. 2 and there exchanges heat with the fresh ventilation air 19 in the fresh-air heat recovery channels 22. Subsequently, the used air 11 flows to the outside via (main) used-air discharge header 32.

Figure 16:
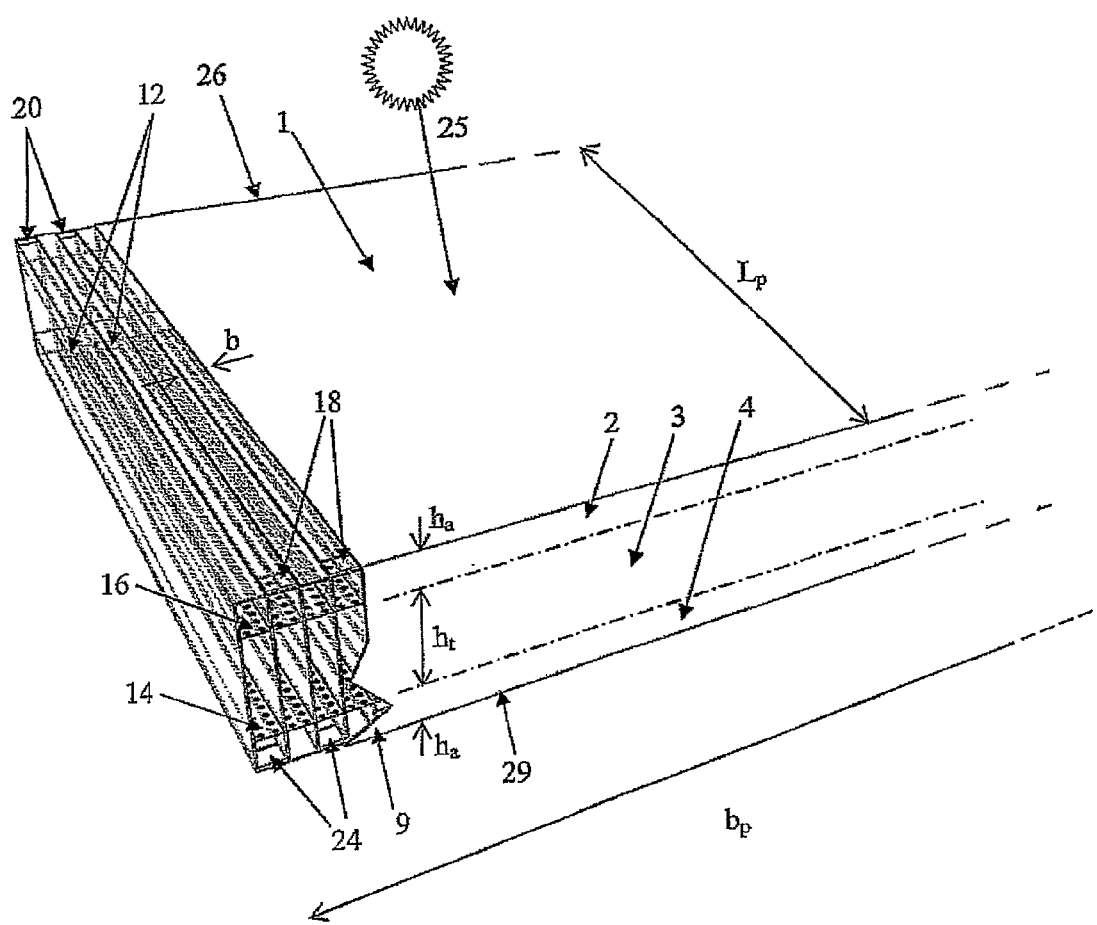
FIG. 16 shows an embodiment of the heat recovery installation according to the present invention.

FIG. 16 shows an embodiment of the present invention, consisting of a plastic three-channel plate 1 which is extruded or moulded. The channel plate 1 comprises the first supply and discharge channel layer 2, the heat recovery channel layer 3 and the second supply and discharge channel layer 4. The fourth plate 29 is provided with, alternately, used-air supply apertures 12 and fresh-air discharge apertures 24 by means of a cutting or vaporizing away using a laser. In the first plate 26 the used-air discharge apertures 18 and the fresh-air supply apertures 20 are alternately arranged, likewise by means of a cutting or laser ablation process. The third plate 14 and the second plate 16 are perforated by producing perforations in the plates 14 and 16 in the heat recovery channel layer 3 by laser ablation or by means of hot pins. The end sides are sealed by sealing plates 9 by welding or gluing these to the three-channel plate 1.

FIG. 17 and FIG. 18 show a second embodiment of the present invention. In this case, the three-channel plate 1 illustrated in FIG. 1 is made from a concertina folded in FIG. 17, in which the channels 13, 17, 21 and 23 illustrated in FIG. 18 and perforated on one side are alternately pushed between the folds of the folded concertina from FIG. 17 and subsequently glued or welded on in order to form the three-channel plate 1 from FIG. 1. Subsequently, the supply and discharge apertures 12, 18, 20 and 24 and the sealing plates 9 are provided, just like in FIG. 16.

FIG. 19 and FIG. 20 show a third embodiment of the present invention. In this case, the three-channel plate 1 illustrated in FIG. 1 is made from an extruded or moulded single-channel plate illustrated in FIG. 19, into which the channels 13, 17, 21 and 23 illustrated in FIG. 20 and perforated on one side are alternately pushed into the channels of the single-channel plate from FIG. 17 and subsequently glued or welded on to form the three-channel plate 1 from FIG. 1. Subsequently, the supply and discharge apertures 12, 18, 20 and 24 and the sealing plates 9 are provided, just like in FIG. 16. The channels 13, 17, 21 and 23 are of tapering design. In this case, the pressure drop of the air flowing through them is equal to the pressure drop of straight channels 13, 17, 21 and 23, whereas the average height can thus be smaller. The pressure drop is identical in this case, because the amount of air becomes smaller towards the thin tapering end, as when the air flows through the perforations in the perforated plates 14 and 16, it increases or decreases. Due to the tapering design of the channels 13, 17, 21 and 23, the average height of these channels 13, 17, 21 and 23 can be lower than with straight channels and therefore also the total height (thickness) of the three-channel plate 1.

Figure 21:
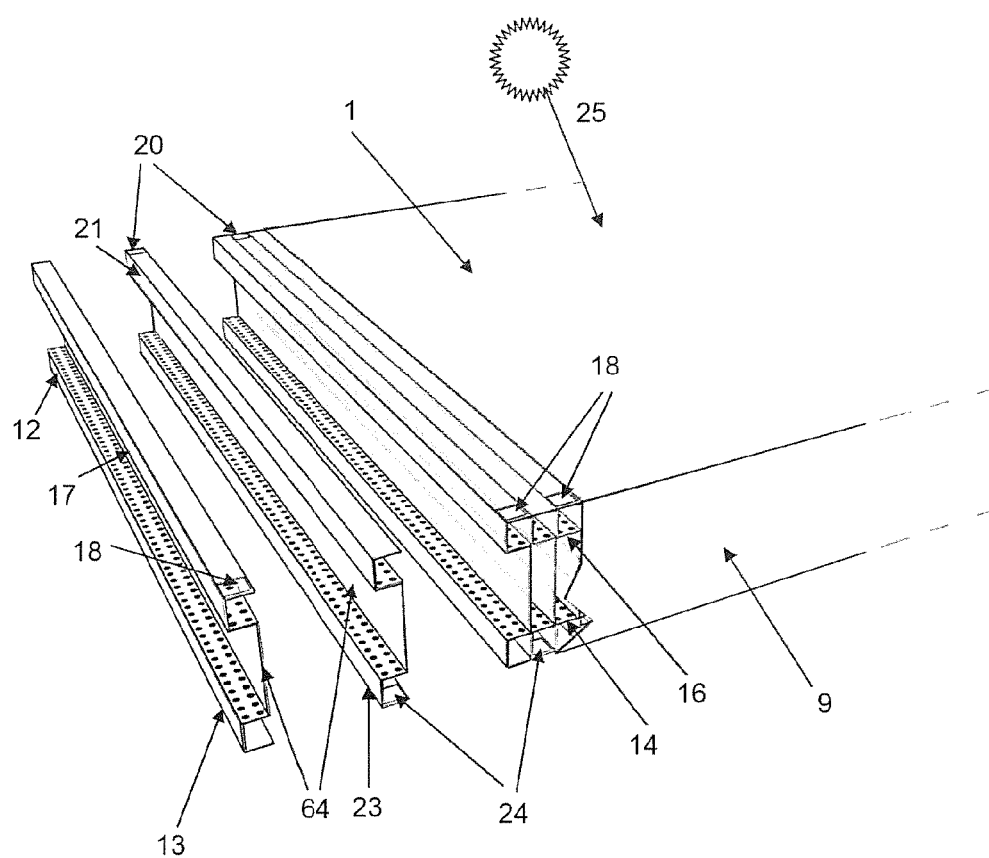
FIG. 21 shows a fourth embodiment of the heat recovery installation according to the present invention.

FIG. 21 shows a fourth embodiment of the present invention. The three-channel plate 1 illustrated in FIG. 1 is in this case made from prefabricated blanks 64 folded from sheet material. The perforations of the channels 13, 17, 21 and 23 are already provided in the prefabricated blanks 64. The prefabricated blanks 64 are glued or welded together to form the three-channel plate illustrated in FIG. 1. Subsequently, the supply and discharge apertures 12, 18, and 24 and the sealing plates 9 are provided, just like in FIG. 16.

Figure 22:
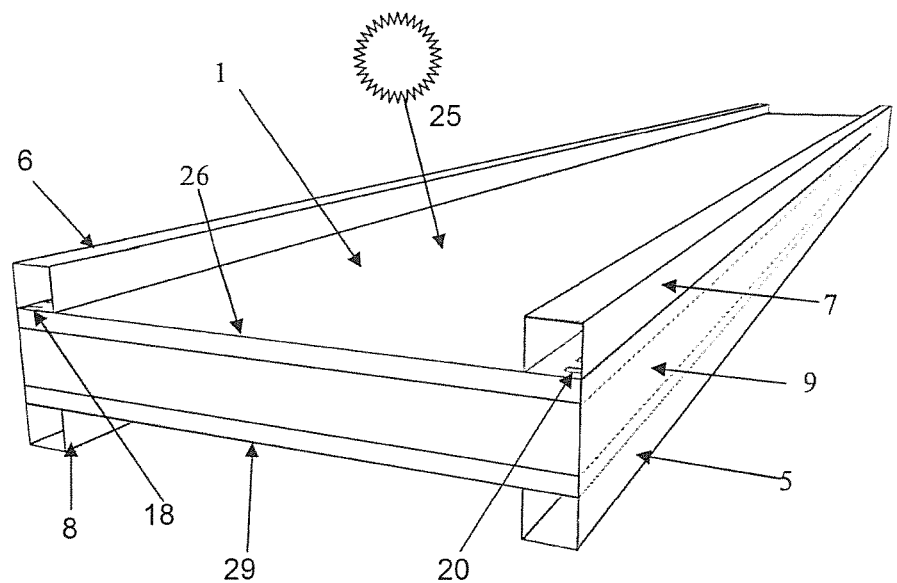
FIG. 22 shows a fifth embodiment of the heat recovery installation according to the present invention.

FIG. 22 shows a fifth embodiment of the present invention, in which the headers 5, 6, 7 and 8 are glued or welded onto the plates 26 and 29 of the three-channel plate 1 from FIGS. 16, 17 and 18, 19 and 20 or 21. The headers are preferably made from a U-shaped profile made from polycarbonate or plexiglass. In this case, the supply and discharge apertures 12, 18, 20 and 24 are provided in the first plate 26 and the fourth plate 29. As a result thereof, the used-air supply header 5 is connected to the used-air supply apertures 12 (not shown), the used-air discharge header 6 to the used-air discharge apertures 18, the fresh-air supply header 7 to the fresh-air supply apertures 20 and the fresh-air discharge header 8 to the fresh-air discharge apertures 24 (not shown).

Figure 23:
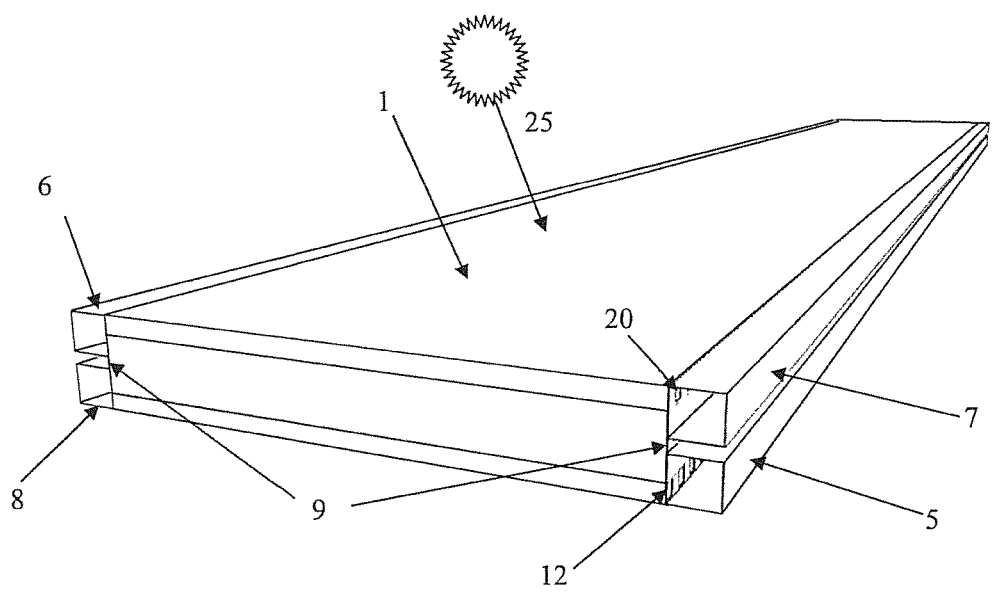
FIG. 23 shows a sixth embodiment of the heat recovery installation according to the present invention.

FIG. 23 shows a sixth embodiment of the present invention, in which the headers 5, 6, 7 and 8 are glued or welded onto the sealing plates 9 of the three-channel plate 1 from FIGS. 16, 17 and 18, 19 and 20 or 21. The headers are preferably made from a U-shaped profile made from polycarbonate or plexiglass. In this case, the supply and discharge apertures 12, 18, 20 and 24 are provided in the sealing plates 9. As a result thereof, the used-air supply header 5 is connected to the used-air supply apertures 12, the used-air discharge header 6 to the used-air discharge apertures 18 (not shown), the fresh-air supply header 7 to the fresh-air supply apertures 20 and the fresh-air discharge header 8 to the fresh-air discharge apertures 24 (not shown).

In a practical embodiment of one or more of the abovementioned embodiments, the dimensions of the channel plate 1 given in FIG. 16 can be seen, with the average height $h_a$ of the channels 13, 17, 21 and 23 in the supply and discharge channel layers 2 and 4 preferably being 5 to 30 mm and the height $h_t$ of the heat recovery channels 15 and 22 in the heat recovery channel layer 3 preferably being 30 to 200 mm.

The longitudinal dimension $L_p$ of the channel plate 1 is preferably 200 to 1000 mm. The width dimensions of the channel plate 1, with the width of the channel plate 1 $b_p$ preferably being 200 to 5000 mm and the width b of an individual channel preferably being 2 to 20 mm. The perforated plates 14 and 16 are provided with holes having a diameter of preferably 0.5 to 10 mm.

The present invention is not limited to the abovementioned embodiments thereof and many changes and modifications are conceivable without departing from the scope of the attached claims. All the above-described embodiments can also be used in combination or coupled to one another.

The invention claimed is:
1. A heat recovery installation, comprising:
a channel plate, comprising:
a first plate, second plate, third plate and fourth plate arranged parallel to one another; wherein the first, second and third plates are at least partially transparent so as to allow (sun)light through from one side of the channel plate to the fourth plate; wherein the fourth plate is provided with a light-absorbing layer for converting the (sun)light into heat and for giving off the heat to fresh-air and used-air in the channel plate;
partitions for connecting the first, second, third and fourth plate provided approximately at right angles to the latter,
wherein a first supply and discharge channel layer is formed between the first plate and the second plate, comprising alternately arranged fresh-air supply channels and used-air discharge channels separated by the partitions;
wherein a heat recovery channel layer is formed between the second plate and the third plate, comprising alternately arranged fresh-air heat recovery channels and used-air heat recovery channels separated by the partitions and adjoining the channels of the first supply and discharge channel layer via perforations in the second plate;
wherein a second supply and discharge channel layer is formed between the third plate and the fourth plate, comprising alternately arranged fresh-air discharge channels and used air supply channels separated by the partitions and adjoining the channels of the heat recovery channel layer via perforations in the third plate;
a fresh-air supply header which is connected to the fresh-air supply channels via fresh-air supply apertures;
a fresh-air discharge header which is connected to the fresh-air discharge channels via fresh-air discharge apertures;
a used-air supply header which is connected to the used-air supply channels via used-air supply apertures;
a used-air discharge header which is connected to the used-air discharge channels via used-air discharge apertures;
wherein a first air pump is arranged for pumping fresh air from the fresh-air supply header to the fresh-air discharge header; and wherein a second air pump is arranged for pumping used air from the used-air supply header to the used-air discharge header, for producing a flow of fresh air in the fresh-air heat recovery channels and an opposite flow of used air in the used-air heat recovery channels of the heat recovery channel layer.

2. The heat recovery installation according to claim 1, wherein the flow of fresh air in the fresh-air heat recovery channels and the flow of used air in the used-air heat recovery channels are approximately transverse to the longitudinal direction of said channels.

3. The heat recovery installation according to claim 1,
wherein the channel plate has a height (ha+ht+ha) which is smaller than the width (bp) or length (Lp) thereof, and
wherein the flow of fresh air in the fresh-air heat recovery channels and the flow of used air in the used-air heat recovery channels flow approximately in the direction of the height of the channel plate.

4. The heat recovery installation according to claim 3,
wherein a height (ht) of the heat recovery channel layer is greater than a height (ha) of the first and of the second supply and discharge channel layer.

5. The heat recovery installation according to claim 1, wherein the first air pump and the second air pump are arranged to produce a flow velocity of the flow of fresh air in the fresh-air heat recovery channels and of the flow of used air in the used-air heat recovery channels, respectively, and that the flow velocity is greater than the heat velocity (Pe<<1).

6. The heat recovery installation according to claim 1, wherein which the channel plate is provided on both sides with a sealing plate for sealing the ends of all channels of the channel plate in an approximately airtight manner.

7. The heat recovery installation according to claim 1, wherein
the fresh-air supply header is connected to ends of the fresh-air supply channels;
the fresh-air discharge header is connected to ends of the fresh-air discharge channels;
the used-air supply header is connected to ends of the used-air supply channels; and/or
the used-air discharge header is connected to ends of the used-air discharge channels.

8. The heat recovery installation according to claim 1, wherein the first plate is provided with a spectral-selective layer for reflecting heat radiation with a radiation temperature of less than 400 K with a reflectance greater than 90%.

9. The heat recovery installation according to claim 1, comprising a folding or rolling light screen, for covering the channel plate.

10. The heat recovery installation according to claim 1,
wherein the supply and discharge channels are of tapering design, and
wherein a cross section of the supply channels decreases downstream and a cross section of the discharge channels increases downstream.

11. The heat recovery installation according to claim 1,
wherein the channel plate comprises a fifth plate following the fourth plate for forming a heat transport medium channel layer comprising heat transport medium channels in which a heat transport medium is provided, and
wherein a light-absorbing layer is arranged on the fifth plate for giving off heat to the heat transport medium.

12. The heat recovery installation according to claim 11, wherein the heat transport medium channels of the heat transport medium channel layer are connected, at a first end, to a heat transport medium supply header and, at the second end, are connected to a heat transport medium discharge header.

13. The heat recovery installation according to claim 11, wherein the heat transport medium channels of the heat transport medium channel layer are connected to a heat exchanger for exchanging heat with a ground.

14. The heat recovery installation according to claim 1, wherein the direction of flow of fresh air and the flow of used air in the heat recovery channel layer is reversible.

15. The heat recovery installation according to claim 1, comprising shut-off valves for, in an open position, cooling the heat exchanger and/or the heat transport medium channel layer using outside air.

16. The heat recovery installation according to claim 1,
wherein the channel plate is made from an extruded or moulded three-channel plate, and
wherein perforations are provided in the second plate and third plate by means of vaporization using a hot needle or laser beam.

17. The heat recovery installation according to claim 1,
wherein the channel plate provided with perforations is made from an extruded or moulded single-channel plate,
wherein preprocessed supply and discharge channels are glued on or welded on in the channels of this plate, and
wherein perforations have been provided in the walls beforehand, which correspond to the second plate and third plate in the end product.

18. The heat recovery installation according to claim 1,
wherein the channel plate provided with perforations is made from a sheet folded in a concertina-like fashion with preprocessed supply and discharge channels which are glued or welded between the folds, and
wherein perforations have been provided in the walls beforehand, which correspond to the second plate and third plate in the end product.

19. The heat recovery installation according to claim 1,
wherein the channel plate provided with perforations is made from pre-formed prefabricated blanks, which consist of a concertina made from the plate parts of one supply, one discharge and one heat exchange channel and only one partition of a supply, a discharge and a heat exchange channel, and
wherein perforations have been made in the walls beforehand, which correspond to the second plate and third plate in the end product, wherein the channel plate is formed by gluing or welding the prefabricated blanks onto the respective corners of the concertina.

* * * * *